United States Patent
Piccionelli et al.

(10) Patent No.: US 7,827,116 B2
(45) Date of Patent: Nov. 2, 2010

(54) METHODS OF PRODUCING AND TRANSMITTING CONTENT BASED ON COMPLIANCE

(76) Inventors: Gregory A. Piccionelli, 30801 Calaise Ct., Westlake Village, CA (US) 91362; Michael M. Gerardi, 28876 Woodcrest Lake Dr., Manifee, CA (US) 92584; David W. Slaughter, 114 E. Mesa Verde, Las Vegas, NV (US) 89123; Dwight J. Batts, 15 Louis Avenue, Newington (AU) 2127

( * ) Notice: Subject to any disclaimer, the term of this patent is extended or adjusted under 35 U.S.C. 154(b) by 1223 days.

(21) Appl. No.: 11/140,598

(22) Filed: May 26, 2005
(Under 37 CFR 1.47)

(65) Prior Publication Data
US 2006/0064356 A1    Mar. 23, 2006

Related U.S. Application Data

(63) Continuation-in-part of application No. 10/644,635, filed on Aug. 19, 2003, now abandoned.

(60) Provisional application No. 60/404,737, filed on Aug. 20, 2002.

(51) Int. Cl.
    *G06Q 99/00* (2006.01)
(52) U.S. Cl. ......................................... 705/317; 705/1.1
(58) Field of Classification Search ..................... 705/1, 705/26, 27, 1.1, 317
    See application file for complete search history.

(56) References Cited

U.S. PATENT DOCUMENTS

| | | | | |
|---|---|---|---|---|
| 6,154,172 A | * | 11/2000 | Piccionelli et al. | 342/357.1 |
| 6,171,112 B1 | * | 1/2001 | Clark et al. | 434/322 |
| 2003/0051238 A1 | | 3/2003 | Barone, Jr. | |
| 2004/0078318 A1 | * | 4/2004 | Miller | 705/38 |
| 2006/0085419 A1 | * | 4/2006 | Rosen | 707/9 |

OTHER PUBLICATIONS http://www.baytsp.com, <retrieved via archive.org http://web.archive.org/web/*/www.baytsp.com> Retrieved on May 17, 2006, latest date relied on Feb. 8, 2001.*
http://www.videochat.com, <retrieved via archive.org http://web.archive.org/web/*/www.videochat.com> Retrieved on May 17, 2006, latest date relied on Jan. 19, 2002.*
Testimony of Mark M. Ishikawa, CEO, BayTSP.com, Inc., Before the Commission on Online Child Protection "Other Technologies and Methods", San Jose State University, San Jose, CA, Aug. 4, 2000.*
Testimony of Mark M. Ishikawa before the Commission on Online Child Protection, San Jose State University, Aug. 4, 2000.*
BayTSP (copyright 1999-2000 BayTSP.com Inc.).

* cited by examiner

*Primary Examiner*—Amee A Shah

(57) ABSTRACT

A method of transmitting content over a network, the content depicting at least one person and being subject to a record-keeping requirement, includes the steps of: providing information pertaining to a person depicted in at least a portion of the content in accordance with a record-keeping requirement; associating the information with the content; providing the associated information to a custodian; verifying that the information complies with the record-keeping requirement; and transmitting the content over a network.

69 Claims, 21 Drawing Sheets

METHODS OF PRODUCING AND TRANSMITTING CONTENT BASED ON COMPLIANCE

This application is a continuation-in-part of U.S. patent application Ser. No. 10/644,635, filed Aug. 19, 2003, now abandoned which in turn was based on U.S. Provisional Patent Application Ser. No. 60/404,737, filed Aug. 20, 2002, the entire disclosures of each of which are incorporated herein by reference.

FIELD OF THE INVENTION

The present invention relates to methods of producing performances that are subject to a record-keeping requirement, and to systems for producing such performances and for storing the required records with a custodian thereof. More specifically, the present invention relates to methods for producing performances, which can be live or pre-recorded performances, that are transmitted over a network, in particular a computer network such as the Internet.

BACKGROUND OF THE INVENTION

The entertainment industry is a multi-billion dollar industry. In particular, the adult entertainment industry is estimated to comprise a market generating yearly revenues in excess of $50 billion per year. The on-line adult entertainment industry within the larger adult entertainment industry alone generates more that $1 billion in revenue each year.

The creation and commercial distribution of sexually explicit materials has traditionally been subject to a substantial amount of regulation, including record-keeping requirements under U.S. federal law. Of particular concern are the U.S. federal laws that pertain to child pornography and the prevention of exploitation of children in the production of sexually explicit materials. Record-keeping requirements pertaining to the production of images of actual sexually explicit conduct are set forth in 18 U.S.C. §2257 (discussed further below, as that section and associated regulations were in effect as of 2002). Sexually explicit conduct the actual performance of which is subject to federal record-keeping requirements is defined at 18 U.S.C. §2256(A)-(D) and includes sexual intercourse (as broadly defined), bestiality, masturbation and sadistic or masochistic abuse.

Any "producer", as defined by the statute, involved in the creation or commercial distribution of visual images which depict any of the actual sexually explicit conduct listed in the statute is required to maintain certain records. This requirement attaches whenever images of actual sexually explicit conduct are created, even if the creator of the images later only distributes, licenses or sells cropped or otherwise "sanitized" versions of the images which do not show the actual sexually explicit conduct. Distributors of images of actual sexually explicit conduct, however, are only required to comply with the record-keeping requirements if the images in fact "contain" visual depictions of actual sexually explicit conduct.

U.S. federal regulations defining those parties who are required to comply with the statutory record-keeping requirements, and setting forth the record-keeping requirements with which such parties must comply, are set forth at 28 C.F.R. Part 75. Producers include "primary producers" and "secondary producers." A primary producer is defined as any person who actually films, videotapes, or photographs a visual depiction of actual sexually explicit conduct. A secondary producer is defined as any person who produces, assembles, manufactures, publishes, duplicates, reproduces, or reissues a book, magazine, periodical, film, videotape, or other matter intended for commercial distribution that contains a visual depiction of actual sexually explicit conduct. Both primary and secondary producers are subject to the record-keeping requirements prescribed by 18 U.S.C. §2257.

Any producer (primary or secondary) of any material containing one or more visual depictions of actual sexually explicit conduct made after Jul. 3, 1995 must comply with the statutory record-keeping requirements for each performer portrayed in such visual depictions. As specified in 28 C.F.R. Part 75.2, the producer must obtain identification documents showing the legal name and date of birth of each performer obtained by an examination document. In addition, for any performer portrayed in such a depiction after May 26, 1992, the records shall also include a legible copy of the identification document, and, if the document does not contain a recent and recognizable picture of the performer, then a legible copy of a picture identification card. A "picture identification card" for this purpose denotes a document issued by a government entity or by a private entity, such as a school or a private employer, that bears the photograph of the individual and the person's name. Such cards can include a passport, driver's license, work identification card, school identification card, selective service card, or an ID card issued by a state.

In addition to the performer's legal name, the producer must also obtain any name ever used by the performer, including the performer's maiden name (if any), alias, nickname, stage name or professional name. For any performer portrayed in such a depiction made after May 26, 1992, such names must also be indexed by the title or identifying number of the book, magazine, film videotape, or other matter.

A secondary producer may satisfy the record-keeping requirement by accepting from the primary producer copies of the required records as set forth above. The secondary producer shall also keep records of the name and the address of the primary producer from whom the copies of the records were received.

Records required to be maintained according to the foregoing statutory provisions are to be categorized and retrievable to all names of each performer, including the performer's maiden name, aliases, nicknames, stage names and professional names, and also according to the title, number or other similar identifier of each book, magazine, periodical, film, videotape, or other matter.

Any producer required to maintain records as described above must make the records available at the producer's place of business. The business address must refer to a street address and not to a post office box number. Such records are to be maintained as long as the producer remains in business, and in the event that the producer ceases to carry on the business, for five years thereafter.

Each copy of the matter which is subject to the statutory record-keeping requirement must bear a statement describing the location of the required records. The statement must contain the title of the book, magazine, periodical, film or videotape or other matter, or if there is no title, an identifying number or similar identifier which differentiates the matter from other matter which the producer has produced, as well as the date of production, manufacture, publication, duplication, reproduction or reissuance of the matter; the street address at which the required records may be available. If the producer is an organization, such as a corporation, the statement must also contain the name, title and business address of the individual employed by the organization who is responsible for maintaining the required records (i.e., the custodian of the records). The information contained in the statement must be accurate as of the date on which the matter is sold, distributed, redistributed or re-released.

Printed materials must include the required statement either on the first page that appears after the front cover, or on the page on which the copyright information (if any) appears. With respect to films and videotapes that have credits, the statement shall be presented at the end of the "end titles" or final credits and shall be displayed for a sufficient duration to be capable of being read by the average viewer. If the film or videotape has no credits, then the statement shall appear within one minute from the start of the film or videotape and before the opening scene.

Certain depictions are exempted from the record-keeping requirements discussed above. Matter that only contains depictions of actual sexually explicit conduct made prior to Nov. 1, 1990 or is produced, manufactured, published, duplicated, reproduced or reissued prior to May 26, 1992; contains only visual depictions of simulated sexually explicit conduct; or contains only combinations of the preceding types of visual matter, are exempt. Furthermore, if the primary producer certifies to a secondary producer that all visual materials fall within the exempted categories set forth above, then the secondary producer may (but is not required to) affix a statement to every copy of the matter that the matter is not covered by the record-keeping requirements of 18 U.S.C. §2257 and 28 C.F.R. Part 75.

A person or entity operating a website which is involved in the commercial distribution of visual depictions of actual sexually explicit conduct most likely would be classified as a "secondary producer" as described above, and therefore must comply with the statutory record-keeping requirements. With respect to websites, the location of the required statement describing the location of the records is to be displayed consistent with the manner of display required for the categories of materials which are specifically dealt with in the regulations (i.e., books, magazines and periodicals, and film and videotapes). The notice preferably should appear on the bottom of the home page along with the copyright information, or on a separate page immediately after the home page. In all events, the statement should appear prior to a viewer's accessing pictorial content that includes depictions of actual sexually explicit conduct.

In addition, the following (or similar) disclaimer is beneficially displayed on every website which contains visual depictions of actual or simulated sexual conduct:

ALL OF THE PERFORMERS WHOSE IMAGES APPEAR ON THIS SITE AND WHO ARE DEPICTED OR PORTRAYED AS ENGAGING IN ACTS OF ACTUAL OR SIMULATED SEXUAL CONDUCT WERE OVER 18 YEARS OF AGE AT THE TIME THEY WERE PHOTOGRAPHED.

THERE IS NO INTENT OR ATTEMPT TO PORTRAY OR SUGGEST THAT ANY OF THE PERFORMERS WHOSE IMAGES APPEAR ON THIS SITE AND WHO ARE DEPICTED AS ENGAGING IN ACTS OF ACTUAL OR SIMULATED SEXUAL CONDUCT ARE UNDER THE AGE OF 18 OR WERE UNDER THE AGE OF 18 WHEN THEIR PHOTOGRAPH WAS TAKEN.

A need exists for a method and system of producing a record of a performance, such as a live performance, which is subject to a requirement for record-keeping.

A need also exists for a method and system of obtaining, storing and retrieving information regarding on-line live performers who engage in actual sexually explicit conduct in such performances and thus render the performance subject to a record-keeping requirement such as that set forth at 18 U.S.C. §2257.

SUMMARY OF THE PREFERRED EMBODIMENTS

In accordance with one aspect of the present invention, there is provided a method of producing a live performance, the performance being transmitted over a network, the performance being subject to a record-keeping requirement. The method includes the steps of: providing information pertaining to a live performance in accordance with a record-keeping requirement; associating the information with a live performance; providing the associated information to a custodian; and transmitting the live performance over a network.

In particular embodiments, the live performance is transmitted over a computer network to a viewer.

In additional particular embodiments, the viewer is provided with a statement prior to the transmission of the live performance. The statement includes information pertaining to the live performance in accordance with the record-keeping requirement, and in more particular embodiments includes a location, specifically an address, of the custodian.

According to specific embodiments, the live performance is transmitted over the network only after the associated information is provided to the custodian. In additional specific embodiments, the live performance is transmitted to the viewer only after the viewer provides to a site that controls transmission of the live performance verification that the viewing of the live performance is legally permissible at the viewer's physical location.

In accordance with another aspect of the present invention, there is provided a method of producing a live performance, the performance being transmitted over a network, that includes the steps of: providing an identification of a performer of a live performance; verifying the identification of the performer of the live performance; providing all names used by the performer of the live performance in addition to the performer's legal name when the performer has at least name other than the performer's legal name; providing an identification of the live performance and a date of the live performance; associating the information so provided; providing the associated information to a custodian; and transmitting the live performance over a network.

In accordance with a further aspect of the present invention, there is provided a method of producing a live performance, the performance being transmitted over a network, which includes the steps of: providing a verified identification of a performer of a live performance; providing all names used by the performer of the live performance other than the performer's legal name when the performer has at least name other than the performer's legal name; providing an identification of the live performance and a date of the live performance; associating the information so provided; providing the associated information to a custodian; and transmitting the live performance over a network.

In accordance with yet another aspect of the present invention, there is provided a method of producing a live performance, the performance being transmitted over a computer network to a viewer. The method includes the steps of: providing to a custodian prior to commencement of a live performance a verified identification of a performer of the live performance, all names used by the performer of the live performance other than the performer's legal name when the performer has at least name other than the performer's legal name, an identification of the live performance, and a date of the live performance; providing a statement to a viewer over a computer network prior to the commencement of the live performance, the statement including the identification of the live performance, the date of the live performance, and a location of the custodian; and transmitting the live performance to the viewer over the computer network.

The present invention is also beneficially employed when a pre-recorded performance is provided to a viewer over a network. Thus, in accordance with still another aspect of the present invention, there is provided a method of providing a recorded performance to a viewer over a network, the recorded performance being subject to a record-keeping requirement. The method includes the steps of: providing to a custodian information pertaining to a recorded performance in accordance with a record-keeping requirement; providing a statement to a viewer over a network prior to the transmission of the recorded performance to the viewer, the statement including information pertaining to the recorded performance and to the custodian in accordance with the record-keeping requirement; and transmitting the recorded performance to the viewer over the network.

In accordance with still another aspect of the present invention, there is provided a method of providing a recorded performance to a viewer over a network which includes the steps of: providing to a custodian a verified identification of a performer of a recorded performance, all names used by the performer of the live performance other than the performer's legal name when the performer has at least name other than the performer's legal name, an identification of the recorded performance, and a date of the recorded performance; providing a statement to a viewer over a network prior to the transmission of the recorded performance to the viewer, the statement including the identification of the recorded performance, the date of the recorded performance, and a location of the custodian; and transmitting the recorded performance to the viewer over the network.

In accordance with another aspect of the present invention, there is provided a method of transmitting a live performance to a viewer over a network, the performance being subject to a record-keeping requirement. The method includes the steps of: providing information pertaining to a live performance in response to a request from a viewer for a transmission of the live performance over a network, the information being provided in accordance with a record-keeping requirement; associating the information with the live performance; providing the associated information to a custodian; and transmitting the live performance to the viewer over the network.

In accordance with yet a further aspect of the present invention, there is provided a method of producing record of a performance, the performance being transmitted over a network, the performance being subject to a record-keeping requirement. The method includes the steps of: providing information pertaining to a performance in accordance with a record-keeping requirement; associating the information with the performance; providing the associated information to a custodian; and providing means enabling a viewer to access information pertaining to the performance and to the custodian over the network.

Systems for practicing the foregoing inventive methods are also provided according to an additional aspect of the present invention. In a particular embodiment, a system for producing a record of a live performance, the live performance transmitted over a network, the live performance being subject to a record-keeping requirement, includes: means for entering into a database information pertaining to a live performance in accordance with a record-keeping requirement; means for associating the information with a live performance; means for providing the associated information to a custodian; means for providing a viewer with information pertaining to the live performance in accordance with the record-keeping requirement; and means for providing a viewer with access to a transmission of the live performance after receipt by the viewer of information pertaining to the live performance in accordance with the record-keeping requirement.

More generally, methods and systems for producing and transmitting content are provided. Thus, in accordance with another aspect of the present invention, there is provided a method of transmitting content over a network, the content being subject to a record-keeping requirement. The method includes the steps of: providing information pertaining to at least a portion of the content in accordance with a record-keeping requirement; associating the information with the content; providing the associated information to a custodian; and transmitting the content over a network.

Particular inventive methods include cross-referencing and verification of information pertaining to one or more persons depicted in the content. Thus, in accordance with an additional aspect of the present invention, there is provided a method of transmitting content over a network, the content depicting at least one person and being subject to a record-keeping requirement. The method includes the steps of: providing information pertaining to a person depicted in at least a portion of the content in accordance with a record-keeping requirement; associating the information with the content; providing the associated information to a custodian; verifying that the information complies with the record-keeping requirement; and transmitting the content over a network.

Under some circumstances it may be desirable, or even mandatory, to prevent or interrupt transmission of content where some or all of the content is determined not to be, or no longer to be, in compliance with a record-keeping requirement. Thus, in accordance with yet another aspect of the present invention, there is provided a method of preventing transmission of content over a network, the content depicting at least one person and being subject to a record-keeping requirement. The method includes the steps of: providing information pertaining to a person depicted in at least a portion of the content in accordance with a record-keeping requirement; associating the information with the content; providing the associated information to a custodian; verifying that the information does not comply with the record-keeping requirement; and preventing transmission of the content over a network.

Similarly, according to a further aspect of the present invention, there is provided a method of halting transmission of content over a network, the content depicting at least one person and being subject to a record-keeping requirement, the method comprising the steps of: providing information pertaining to a person depicted in at least a portion of the content, the information being classified into a plurality of fields, at least a portion of the plurality of fields being associated with authorization criteria; associating the information with the content; verifying that the information complies with the authorization criteria; determining whether the entry into at least one field associated with a authorization criterion is also associated with a date at which the entry ceases to comply with the authorization criterion; beginning transmission of the content over a network; monitoring the date on which transmission of the content occurs; and halting transmission of the content when the date on which transmission of the content occurs at least equals the date at which the entry ceases to comply with the authorization criterion.

In addition to methods of transmission of content, related methods of production of content are also provided. Thus, in accordance with still a further aspect of the present invention, there is provided a method of producing content, the content depicting at least one person and being subject to a record-keeping requirement. The method includes the steps of: providing information pertaining to a person to be depicted in at least a portion of the content in accordance with a record-keeping requirement; associating the information with the content; providing the associated information to a custodian; verifying that the information complies with the record-keeping requirement; and producing the content.

Production methods that include cross-referencing and verification of additional information not required by a record-keeping regulation are also provided. In accordance with still another aspect of the present invention, there is provided a method of producing content, the content depicting at least one person. The method includes the steps of: providing information pertaining to a person to be depicted in at least a portion of a data stream, the information being classified into a plurality of fields, at least a portion of the fields being associated with authorization criteria; associating the information with the content; verifying that the information complies with the authorization criteria; and producing the content.

Related methods include the use of date-dependent production criteria. In accordance with an additional aspect of the present invention, there is provided a method of producing content, the content depicting at least one person. The method includes the steps of: providing information pertaining to a person to be depicted in at least a portion of the content, the information being classified into a plurality of fields, at least a portion of the plurality of fields being associated with authorization criteria; associating the information with the content; verifying that the information complies with the authorization criteria; determining whether the entry into at least one field associated with a authorization criterion is also associated with a date at which the entry ceases to comply with the authorization criterion; providing a notification when a positive determination is made concerning such date; and producing the content.

As was the case with transmission of content, in certain circumstances it is desirable or mandatory to prevent production of content. Thus, in accordance with another aspect of the present invention, there is provided a method of preventing the production of content, the content being intended to depict at least one person and being subject to a record-keeping requirement. The method includes the steps of: providing information pertaining to a person to be depicted in at least a portion of the content in accordance with a record-keeping requirement; associating the information with the content; verifying that the information does not comply with the record-keeping requirement; and preventing the production of the content.

In accordance with still another aspect of the present invention, there is provided a method of preventing production of content, the content being intended to depict at least one person. The method includes the steps of: providing information pertaining to a person to be depicted in at least a portion of the content, the information being classified into a plurality of fields, at least a portion of the fields being associated with authorization criteria; associating the information with the content; verifying that the information does not comply with the authorization criteria; and preventing production of the content.

The present invention also provides systems for producing content. In accordance with yet another aspect of the present invention, there is provided a system for producing content, the content depicting at least one person. The system includes: means for producing content; a first database; first input means for providing information pertaining to a person to be depicted in the content to the first database; and means for providing a signature of the person to the first database.

The inventive systems are useful in numerous content production methods. Thus in accordance with a further aspect of the present invention, there is provided a method for producing content, the content depicting at least one person. The method includes the steps of: providing a system for producing content as described above; obtaining a digitized model release signed by the person using the means for providing a signature of the person to the first database; providing the digitized signed model release to the first database; providing information pertaining to the person to be depicted in the content to the first data base using the first input means; and producing the content.

In accordance with yet a further aspect of the present invention, there is provided a method for producing content, the content depicting at least one person, at least a portion of the content being subject to a record-keeping requirement. The method includes the steps of: providing a system for producing content as described above; obtaining a digitized model release signed by the person using the means for providing a signature of the person to the first database; providing the digitized signed model release to the first database; providing information pertaining to the person to be depicted in the content in accordance with the record-keeping requirement to the first data base using the first input means and associating the information with the content; and producing the content.

According to an additional aspect of the invention, there is provided a method for producing content, the content depicting at least one person. The method includes the steps of: providing a system for producing content as described above; obtaining a digitized model release signed by the person using the means for providing a signature of the person to the first database; providing the digitized signed model release to the first database; providing information pertaining to the person to be depicted in the content to the first data base using the first input means, wherein the information is classified into a plurality of fields; and producing the content.

Multiple databases can also be employed. Thus, according to a further aspect of the present invention, there is provided a method for producing content, the content depicting at least one person, at least a portion of the content being subject to a record-keeping requirement. The method includes the steps of: providing a system for producing content as described above, the system further including a second database in communication with the first database; obtaining a digitized model release signed by the person using the means for providing a signature of the person to the first database; providing the digitized signed model release to the first database; providing information pertaining to the person to be depicted in the content to the first data base using the first input means, the information being provided in accordance with the record-keeping requirement and being associated with the content; and producing the content.

Similarly, according to still a further aspect of the present invention, there is provided a method for producing content, the content depicting at least one person, at least a portion of the content being subject to a record-keeping requirement. The method includes the steps of: providing a system including means for producing content, a first database, a plurality of additional databases, the first database and the plurality of additional databases being organized into a hierarchical structure comprising a plurality of levels, first input means for providing information pertaining to a person to be depicted in the content to the first database, and means for providing a signature of the person to the first database; obtaining a digitized model release signed by the person using the means for providing a signature of the person to the first database; providing the digitized signed model release to the first database; providing information pertaining to the person to be depicted in the content to the first data base in accordance with the record-keeping requirement using the first input means, and associating the information with the content; and producing the content.

According to another aspect of the present invention, there is provided a method for producing content, the content depicting at least one person, at least a portion of the content being subject to a record-keeping requirement. The method includes the steps of: providing a system for producing content as described above, the system including a first database and a plurality of additional databases; obtaining a digitized model release signed by the person using the means for providing a signature of the person to the first database; providing the digitized signed model release to the first database; providing information pertaining to the person to be depicted in the content to the first data base in accordance with the record-keeping requirement using the first input means, the information being classified into a plurality of fields, and associating the information with the content; providing the associated information to custodians in possession of the first database and each of the additional databases; and producing the content.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

DETAILED DESCRIPTION OF THE PREFERRED EMBODIMENTS

Although exemplary performances which are produced according to methods of the present invention may include actual sexually explicit conduct, such that production of visual images of the performance may be subject to statutory regulations as discussed above, the present invention is by no means limited to the production of such performances or to the generation of records pertaining to such performances.

As used herein, the term "custodian" denotes any person who is in possession of at least one record of a performance that is subject to a record-keeping regulation. Such a person can be, for example, a producer as defined in 28 C.F.R. Part 75, or an individual employed by an organization that is itself a producer.

Figure 1:
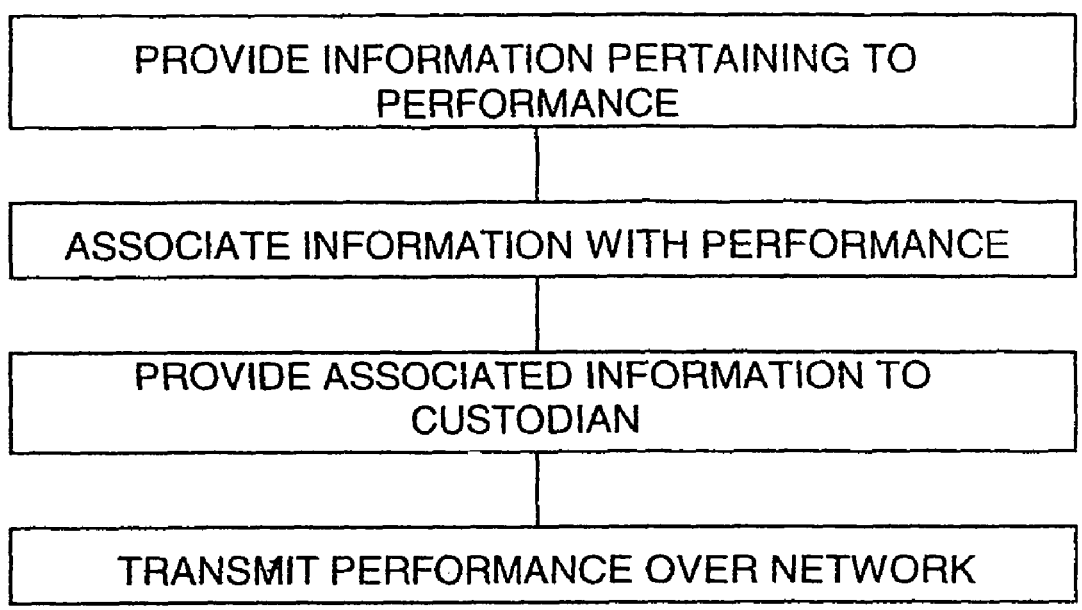
FIG. 1 is a flowchart illustrating a general method according to the invention.

FIG. 1 illustrates a method according to the present invention in a general aspect. Information pertaining to a performance is first provided, more specifically in accordance with a record-keeping requirement such as the requirements established at 18 U.S.C. §2257 and 28 C.F.R. Part 75, which are incorporated in their entirety herein by reference. The information can be provided, in certain embodiments, by one or more performers of a performance which is subject to the record-keeping requirement, and very specifically by every performer who engages in regulated conduct, such as actual sexually explicit conduct, at any time during the course of the performance. In other particular embodiments, the information can be provided by a producer or other individual in possession of the required information. The performance for which the information is provided can be a live performance or a pre-recorded performance (the recording being a book, magazine or other periodical, film, videotape, etc.).

In specific embodiments, the information is provided prior to a request by a viewer over a network for a transmission of the performance to the viewer over the network. For example, in certain particular embodiments, a performer accesses a site on a network over which a live performance is to be transmitted to a viewer, and then provides the required information. In other specific embodiments, the information is provided subsequent to, e.g., in response to, a request by the viewer for a transmission of the performance.

The information can be provided, in particular embodiments, as direct input by the performer by means of a scanner or other electronic device. In other particular embodiments, the performer logs onto a site and then provides a code, an ID number, a credit card account number or the like to the site. Entry of the code enables the performer to access a database including a file that contains the required information pertaining to the performer, for example by activating a hyperlink to such a database.

The information pertaining to the performance can include an identification of a performer, for example a picture identification card; a maiden name, alias, nickname, stage name or professional name used by the performer; other information pertaining to a performer, such as an address, Social Security number, telephone number, etc.; an identification of the performance, such as a title or identification number; a date of the performance, e.g., the date on which the performance is transmitted over a network or the date on which the performance was first recorded; etc.

Additional information can be provided in more specific embodiments, depending on the record-keeping requirements that pertain to the performance. Thus, for example, if a performer has previously appeared in one or more other performances in which visual depictions of actual sexually explicit conduct were produced, such additional information might include the titles or identification numbers of such performances, the dates of the performances, and the legal and other names used by the performer at the times the performances were produced.

Provision of an accurate identification of the performer is of particular importance. Thus, in more specific embodiments, the performer initially submits an identification, such a scanned picture identification card or other documentation. Next, the identification so submitted is verified, for example by submitting or redirecting the identification to a verification site such as a database of verified identification documents. Once the performer's identification is verified, the performer provides additional information as described herein. In other more specific embodiments, the performer provides a verified identification, for example, a code associated with a file in a database of scanned images of verified picture identification cards.

The information is provided, in particular embodiments, to a central site such as a database, or to a site maintained by a producer of the performance. Once the information has been provided to the database or other site, the information is associated with the performance. Thus, for example, the legal name and picture identification of a performer, together with other information such as the performer's aliases or other names other than the performer's legal name, are associated with the title or identification number, and the date, of the performance, for example by storage together in a file in a database.

Once the information has been associated with the performance, the associated information is then provided to a custodian. This can be accomplished, for example, by forwarding the associated information to the custodian via e-mail; by providing the custodian with a hyperlink to a site at which the information can be accessed; by providing the custodian with a hard copy of the information, including a print-out of the performer's personal information and a copy of the performer's scanned picture identification card; or by other means.

After the associated information is provided to the custodian, transmission of the performance to the viewer is enabled. Transmission can commence promptly upon provision of the information to the custodian. In alternative embodiments, the viewer is provided with a statement prior to the transmission of the performance, for example by providing the viewer with a screen including a button which can be activated to access the statement (see FIG. 3b). The button can activate a link to a site maintained by the custodian in specific embodiments, or to a database maintained by another site. The contents of the statement can vary according to the record-keeping requirements to which the performance is subject. For example, the statement can include some or all of the associated information, such as the performer's name(s) and the title and date of the performance, together with a location (e.g., a business street address) of the custodian. Once the viewer accesses the statement, transmission of the performance is authorized and commences. In still other embodiments, the statement is automatically provided to the viewer prior to transmission of the performance to the viewer.

It may be desirable in certain communities to limit access to performances provided according to the present application. Accordingly, in particular embodiments, the physical location of the user is ascertained, for example by GPS means, and access to the performance via the network is controlled on the basis of the user's location. Such access control can be accomplished, for example, according to the methods disclosed in U.S. Pat. No. 6,154,172, to Piccionelli et al., the entire contents of which are incorporated herein by reference. In other particular embodiments, the viewer verifies that viewing the performance in the viewer's physical location is legally permissible, for example by means of a button provided on a screen that provides a statement to this effect to a site controlling transmission of the performance over the network to the viewer.

Revenue-generating specific embodiments of the inventive method include the additional step of providing a viewers credit card account number to a site that controls transmission of the performance. In such embodiments, the viewer is charged a premium in order to view the performance, for example prior to transmission of the performance.

Figure 2:
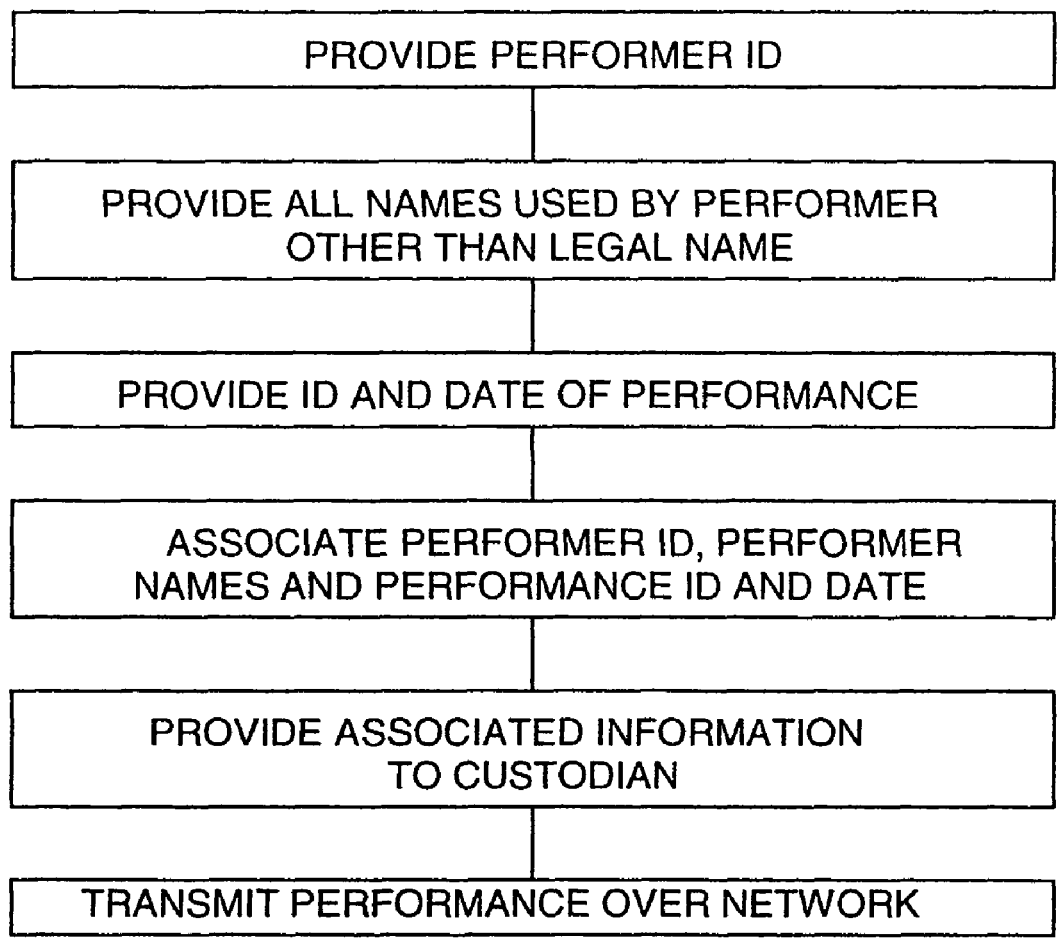
FIG. 2 is a flowchart illustrating a particular method according to the invention in which specific performance information is provided.

FIG. 2 illustrates a more specific method according to the invention. As described herein, the method is implemented by a performer of a live or previously recorded performance; however, the method can also be implemented by other parties, such as producers, or by the performer together with one or more other persons. A performer initially provides an identification, such as a scan of a picture identification card, to a central site controlling transmission of a live performance over a network. The identification can be verified by the central site or by another site, or can be a pre-verified identification. Next, the performer provides all names in addition to the performer's legal name, if the performer has used such additional names. The performer also provides an identification of the performance, such as a title or identification number, and also a date of the performance, for example, the date on which the performance is to take place (which can be the date of submission of the information, in particular embodiments). The performer's identification and name(s) are then associated with the identification and date of the performance, for example by storage together in a file in a database. The associated information is next provided to a custodian, for example by transmission via a network or by other means as previously mentioned. Once the associated information has been provided to the custodian, the performance is then transmitted over a network to a viewer.

In specific embodiments of the method illustrated in FIG. 2, the viewer is provided with a statement including the identification and date of the performance and the location of the custodian.

According to very specific embodiments, the viewer is further enabled to download a copy of the performance. In such embodiments, the statement described above is incorporated in the download of the performance.

Figure 3A:
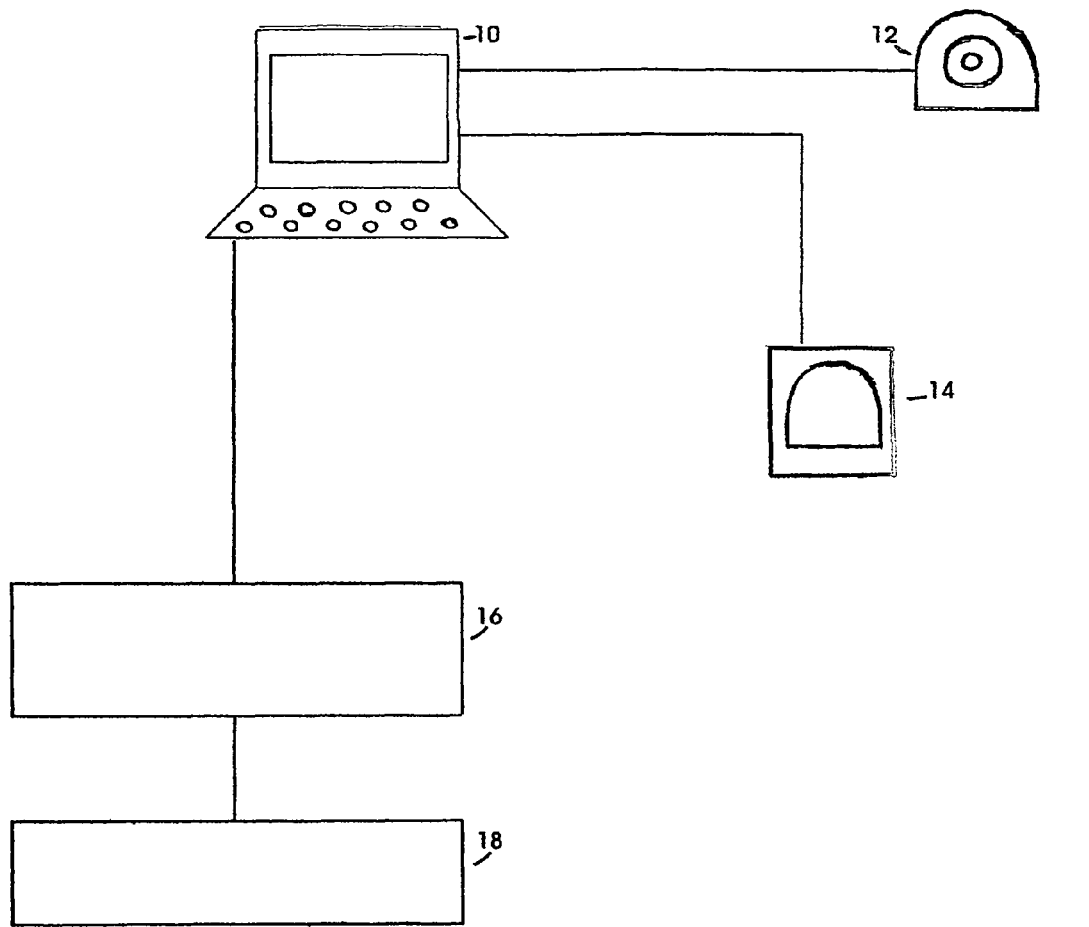
FIGS. 3a-b is a diagram illustrating a system according to the invention and a web page useful in implementing the system
Figure 3B:
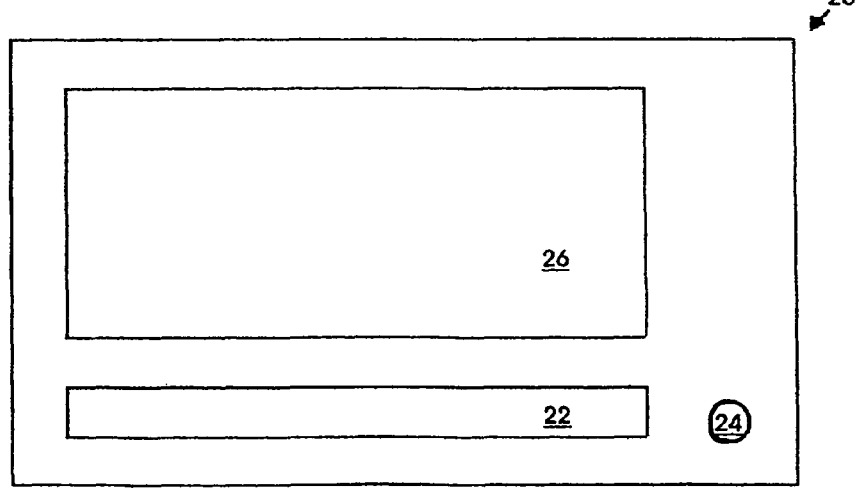

A system useful in implementing methods according to the invention is illustrated in FIGS. 3a-b. In FIG. 3a, a computer 10 is in communication with a video camera 12 and a scanner 14. A performer employs scanner 14 to provide a scanned copy of a picture identification card to a central site 16, and provides additional information such as the performer's legal name, other names such as aliases, stage names, etc., previously used by the performer, a title of a performance in which the performer is to appear, the date of the performance (e.g., the present date), and, in particular embodiments, the titles and dates of other performances in which the performer has appeared together with a listing of aliases, stage names, etc., used by the performer at the time of the prior performances. All of the foregoing information is provided to central site 16, where it is associated, for example by storage in a file. The associated information is then provided to a site 18 maintained by a custodian. Once the information is provided to the custodian, the performer commences the performance, which is transmitted over a network by means of camera 12 to a viewer.

FIG. 3b illustrates an exemplary screen 20 including a box 22 presenting a disclaimer such as that described above, together with a button 24 which can be activated by a viewer in order to access a statement as described above.

The foregoing embodiments of the invention are primarily directed to the production and transmission of live performances. Additional aspects of the invention are applicable to the production and transmission of both live and recorded performances, i.e., to the production and transmission of content in general. As used herein, the term "content" denotes any visual depiction of one or more persons, objects or locations, including still images (i.e., data files) and videos. The videos in turn can be recorded for subsequent sale and/or transmission (video streaming) or transmitted live over a network (live streaming). "Content" includes both the singular and the plural; thus, production of content encompasses production of one or more visual depictions, from a single still image to multiple videos.

Figure 4:
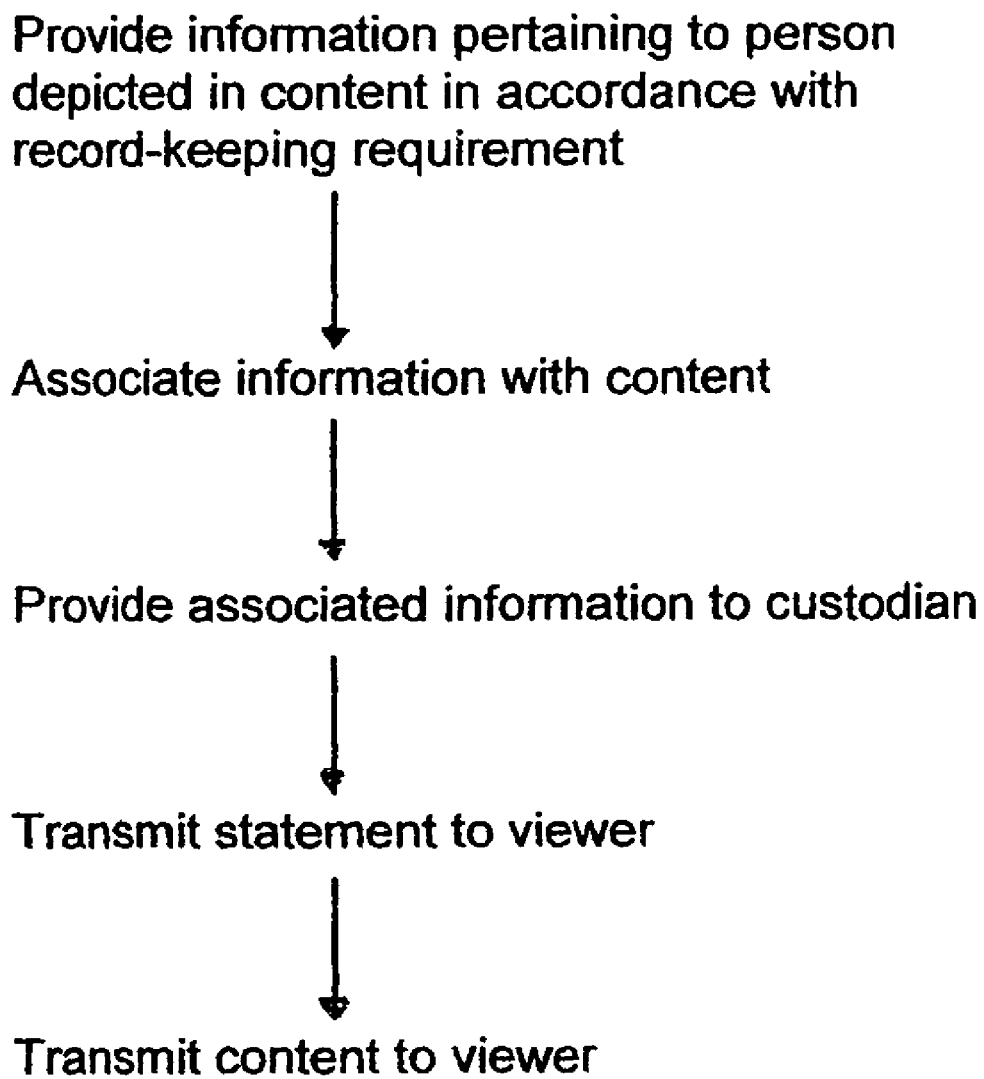
FIG. 4 is a flowchart illustrating a general content transmission method according to the invention.

A general method of transmitting content (whether live or previously recorded, as indicated above) is illustrated in FIG. 4. Information pertaining to at least a portion of the content, for example a portion which includes a depiction of one or more persons engaging in actual sexually explicit conduct, is provided, for example in a manner discussed above. The information is then associated with the content, which can be carried out in a manner previously described, such as by creation of a record including an identification of the portion of the content to which the information pertains (e.g., a person or persons engaged in actual sexually explicit conduct) and the information pertaining thereto. The associated information (e.g., the record so created) is then provided to a custodian. After provision of the associated information to the custodian, the content is then transmitted over a network.

The content can be transmitted over any desired network. Non-limiting examplary networks include computer networks, such as the Internet or a local network; telecommunications networks, such as cellular telephone networks; and the like. In various embodiments, the content is transmitted to and displayed on a device such as a computer monitor, a cellular telephone screen, a hand-held telecommunication device such as a Blackberry™, or the like.

In many particular embodiments of the inventive method, the content is transmitted to a human viewer. Similarly to embodiments previously discussed, the human viewer beneficially provides to a site that controls the transmission of the content, such as a site on the Internet, verification that viewing of the content is legally permissible at the viewer's physical location. Such verification can be provided, e.g., by transmission of the GPS coordinates of the viewer's location to the site, followed by confirmation by the site that the location so identified is located within a jurisdiction in which the viewing is legally permissible. In specific embodiments, the verification is provided by the human viewer prior to transmission of the content to the human viewer.

As well as verification of location in a location in which viewing the content is legally permissible, the human viewer, in further specific embodiments, provides additional information to the site, including, without limitation, proof of the viewer's right to receive the transmission of the content (e.g., proof that the viewer is a member of the site which controls or transmits the content, such as a membership code), and a credit card number. The credit card number beneficially is used both to secure payment of a premium from the viewer prior to transmission of the content, and to ensure that the viewer is of legal age to view the content.

Alternatively or concurrently, the content can also be transmitted to a storage device, such as a personal computer, a server, a DVD (via a DVD burning device), or the like. The storage device can be present at the viewer's location, or can be at a location remote from the viewer.

As discussed above with respect to previous embodiments, particular embodiments of the content transmission method described here and below beneficially provide the viewer, in particular prior to the transmission of the content to the viewer, with a statement as prescribed by a relevant record keeping requirement. Thus, the statement can include, in particular embodiments, information pertaining to the content in accordance with the record keeping requirement, and with a location of a custodian of the information.

In many applications it may be desirable to cross-reference and verify some or all of the information provided to a custodian in accordance with a record-keeping requirement. When information in compliance with the record-keeping requirement is provided, transmission of the content is enabled. Conversely, when the record-keeping requirement is not satisfied due to provision of insufficient or incorrect information, transmission of the content is prevented.

Figure 5:
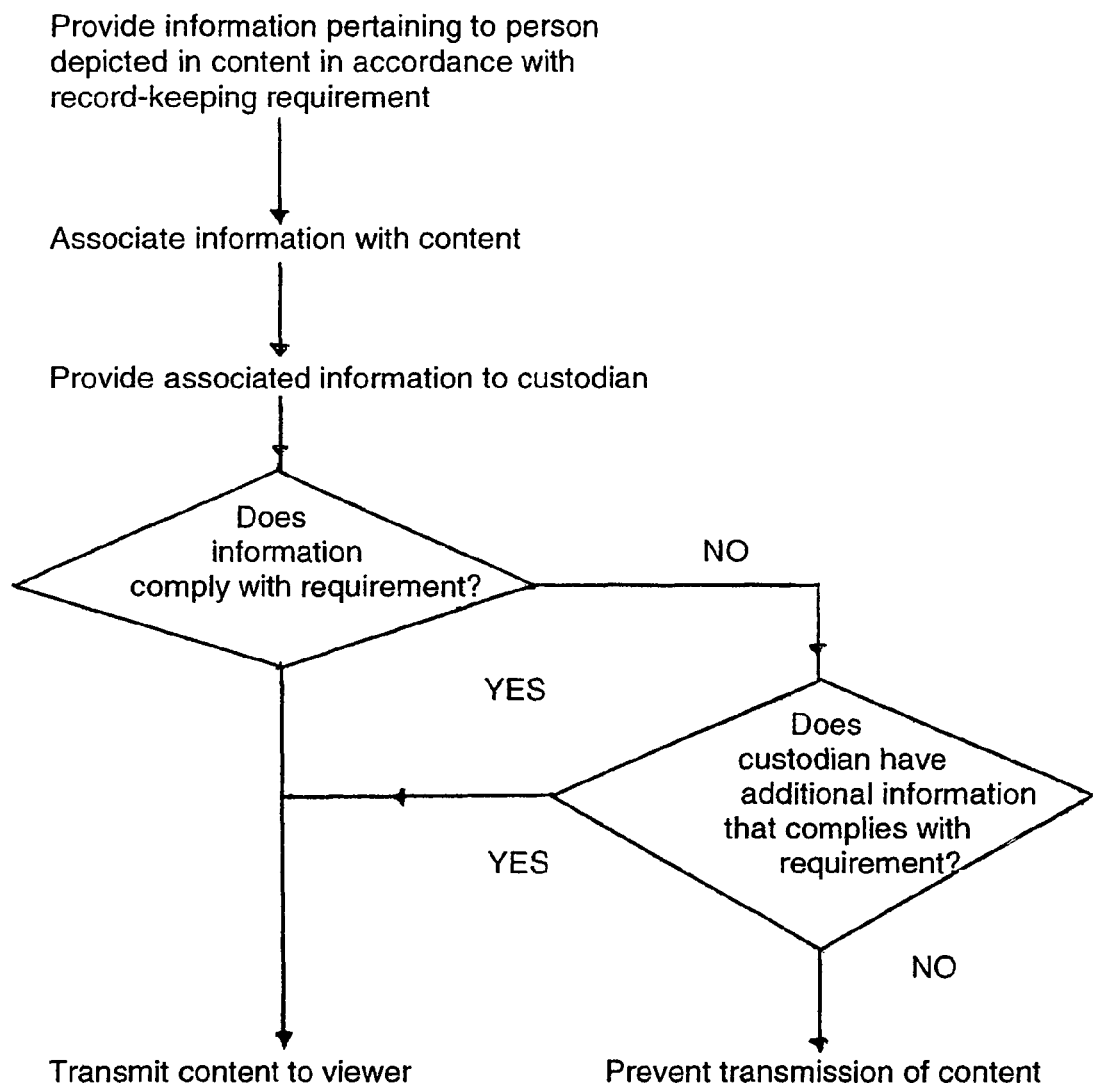
FIG. 5 is a flowchart illustrating a content transmission method using cross-referencing.

Thus, as illustrated in FIG. 5, information pertaining to a person depicted in at least a portion of the content is provided and associated with the content, and the associated information is provided to a custodian similarly to the embodiments discussed above. Next, the associated information is examined in order to determine if the information complies with the record-keeping requirement. If it is determined that the information is in compliance with the record-keeping requirement, then the content is transmitted. If, on the other hand, it is determined that the information is not in compliance with the record-keeping requirement, then transmission of the content is prevented.

The information provided can be classified into one or more fields. Some or all of the information can be classified into fields that are specified by applicable record-keeping requirements. Alternatively, at least a portion of the information can be classified into other fields relating to the production of the content but not specified by a record-keeping requirement. Non-limiting examples of fields into which information can be classified in accordance with methods of the invention include: model details (first name, middle name, last name, maiden name, age, birth date, birth city, birth state, birth country, sex, height, weight, eye color, hair color, measurements (chest, waist, hips), clothing size, shoe size, contact address, contact city, contact state, contact postal code, contact country, contact home phone, contact work phone, contact mobile phone, other contact phone, contact e-mail address, contact website, image file data, image file size, image file name, image thumbnail); model aliases (model ID, model name); production models (production ID, model ID, model alias ID); model remuneration (model ID, client ID, production date, production comments, payment date, payment amount, payment method ID, payment comments); model identification (model ID, ID type, ID number, ID state, ID country, ID expiration date, ID comments, image file data, image file size, image file name, image thumbnail); ID types (description); client details (company name, company address, company city, company state, company postal code, company main phone, company fax, company other phone, company website, contact name, contact main phone, contact fax, contact mobile phone, contact e-mail address); agency details (company name, company address, company city, company state, company postal code, company country company main phone, company fax, company other phone, company web site); model agents (model ID, agency ID, agent name, agent main phone, agent fax, agent mobile phone, agent e-mail address); model health tests (model ID, health test type ID, health test date, health test result ID, image file data, image file size, image file name, image thumbnail); health test results (description); producer details (producer code, company name, company address, company city, company state, company postal code, company country, company main phone, company fax, company other phone, company website, company copyright, contact name, contact main phone, contact fax, contact mobile phone, contact e-mail address); production details (producer ID, image file data, image file size, image file name, image thumbnail, production title, production date, production description); production comments (production ID, comment data); model comments (model ID, comment data); content details (production ID, content type ID, content title, content description, content barcode); content catalog (content ID, image file name, image thumbnail); model release details (model ID, producer ID, production date, comments); model release images (model release ID, image file data, image file size, image file name, image thumbnail); system settings (database image width, database image height, database image JPEG quality, default year start, default country code, default model/sex, exit tagging enable, exit JPEG quality, copyright notice); etc. Some field entries can be included in multiple fields, if desired. All field entries can include the date of addition and modification, system time stamps, status identifications and other identifying indicia, as desired.

At least a portion of the plurality of fields can be associated with authorization criteria. As used herein, "authorization criteria" are conditions that must be met before production and/or transmission of the content is enabled. Some authorization criteria can be determined by a record-keeping requirement; others can be determined by additional considerations such as model health or the need for a model release. Typically, authorization criteria are met by provision of appropriate information to the particular fields with which the criteria are associated. Authorization criteria can also include performance of specified actions to achieve specified results, for example, examination of a medical record to verify freedom from communicable diseases. Non-limiting exemplary fields and authorization criteria associated therewith include the following:

| Field | Authorization Criterion |
|---|---|
| Model ID | Entry of valid identification for model |
| Model age | Entry of proof that model's age at least equals an age specified by record-keeping requirement |
| Model aliases | Entry of all names, if any, used by model other than model's legal name |
| Content ID | Entry of identification of content, e.g., a unique randomly generated identification |
| Production date | Entry of date of production of content |
| Model release | Entry of image of model release executed by model |
| Medical release | Entry of image of medical release executed by model |
| Health test result | Examination of medical record of model pursuant to executed medical release and verification that model is free from communicable disease |

As with preceding methods, the information provided can be used to produce a record, which is associated with the content to which the information pertains. The record is then provided to a custodian. The custodian may possess a plurality of records, each record being associated with different content. This affords the opportunity for cross-referencing and verifying provided information, and allows production to proceed in cases in which some or all of the information which must be provided in order to meet the record-keeping requirement and/or satisfy other authorization criteria has not been or cannot be provided.

For example, prior to transmission of content, it may be necessary to submit information concerning the age of a person depicted in the content, or a listing of aliases, stage names or professional names used by the person so depicted. In the case in which it is determined that the person's age has not been submitted, or all aliases have not been submitted, the custodian (or a database which is in the custodian's possession or which is accessible to the producer of the content) can be queried to determine if any additional records, containing information pertaining to the person, exist and are accessible. If so, the additional records are then examined to determine if the missing information is stored in one or more of the additional records. Upon determining that the missing information is present in one or more additional records, the missing information is copied into the appropriate record for the content to be transmitted. When all information has thus been provided and all authorization criteria (if any) have been satisfied, the content is then cleared for transmission to a viewer (in specific embodiments, after the viewer is provided with a statement as may be required by a pertinent regulation).

In other circumstances, it may be desirable to verify that information provided by a person depicted in a portion of the content is consistent with information provided by the person with respect to other content in which the person has been depicted. This cross-referencing and verification is easily carried out when the custodian, database, etc. includes a plurality of records associated with different content. In the event that inconsistencies are identified, transmission of the content can be prevented until the inconsistencies are rectified.

Some information that is provided in accordance with a record-keeping requirement may be associated with an expiration date, i.e., a date at which the information ceases to comply with the record-keeping requirement or with another authorization criterion. For example, an image of a driver's license may be entered as an identification of a person depicted, or intended to be depicted, in content. The driver's license has an expiration date beyond which it is no longer valid, and thus cannot be used to identify the person.

Figure 6:
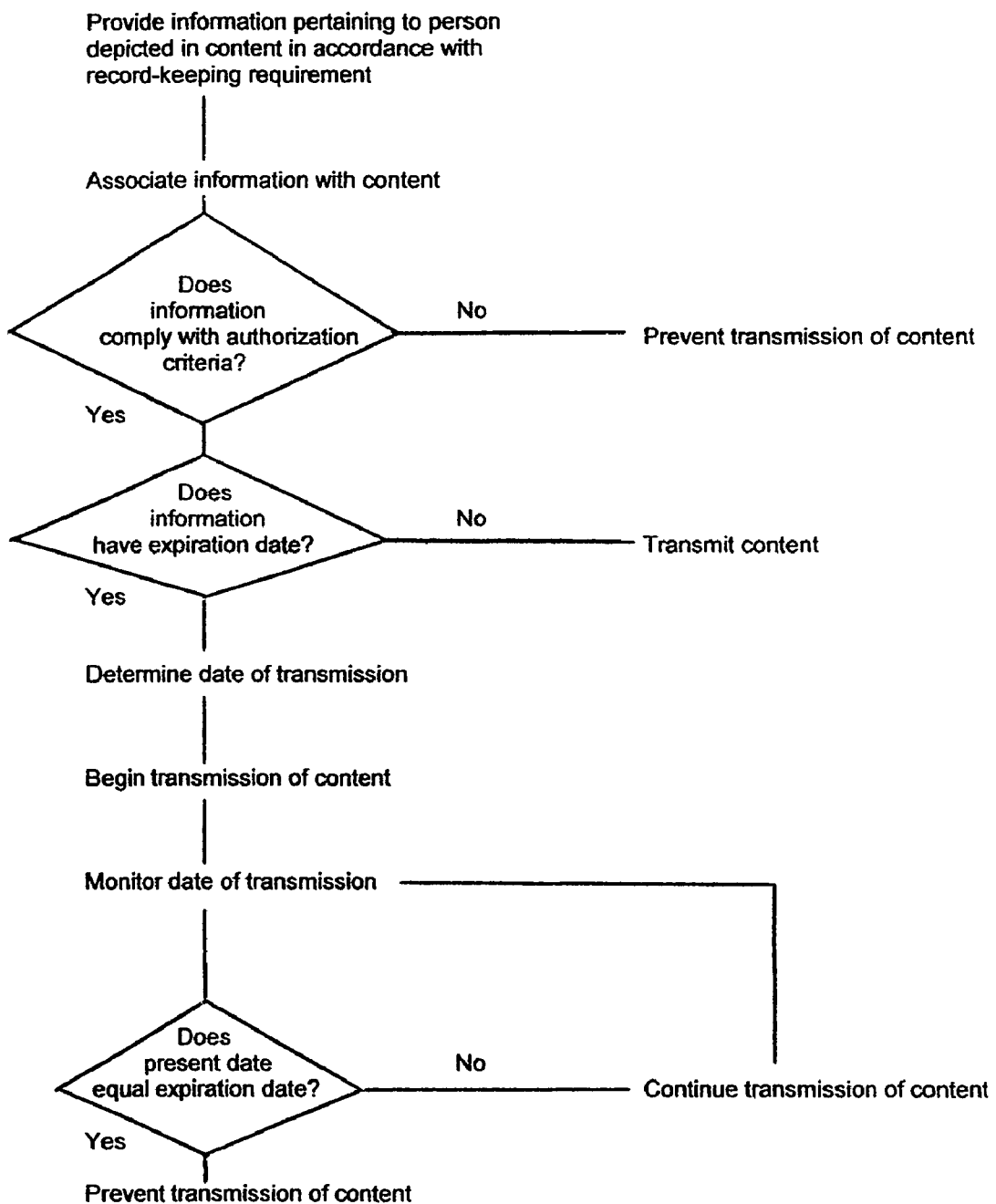
FIG. 6 is a flowchart illustrating a content transmission method for use with date-sensitive information.

A method of the present invention illustrated in FIG. 6 is useful to accommodate date-sensitive information. Information is provided similarly to methods discussed previously; specific embodiments include provision of information that is classified into a plurality of fields, at least some of which are associated with authorization criteria. The information is associated with the content to which it pertains, and evaluated to determine if it complies with the authorization criteria. The information is also examined to determine if any of the information (i.e., information entered into one or more fields), is also associated with a date at which the entry ceases to comply with an authorization criterion, that is, whether the entry has an expiration date. If none of the entries associated with authorization criteria have expiration dates, transmission of the content is enabled as with preceding embodiments. If at least one entry associated with an authorization criterion does have an expiration date, then transmission is enabled only so long as the date on which the content is transmitted is prior to the expiration date. Thus, when an entry has an expiration date, the content is transmitted and the date of transmission is determined. The date is periodically or continually monitored and compared to the expiration date. When it is determined that the date equals or exceeds the expiration date, transmission of the content is halted. Transmission of the content is not resumed or re-enabled until the expired entry is replaced with an entry that complies with the authorization criterion.

Figure 7:
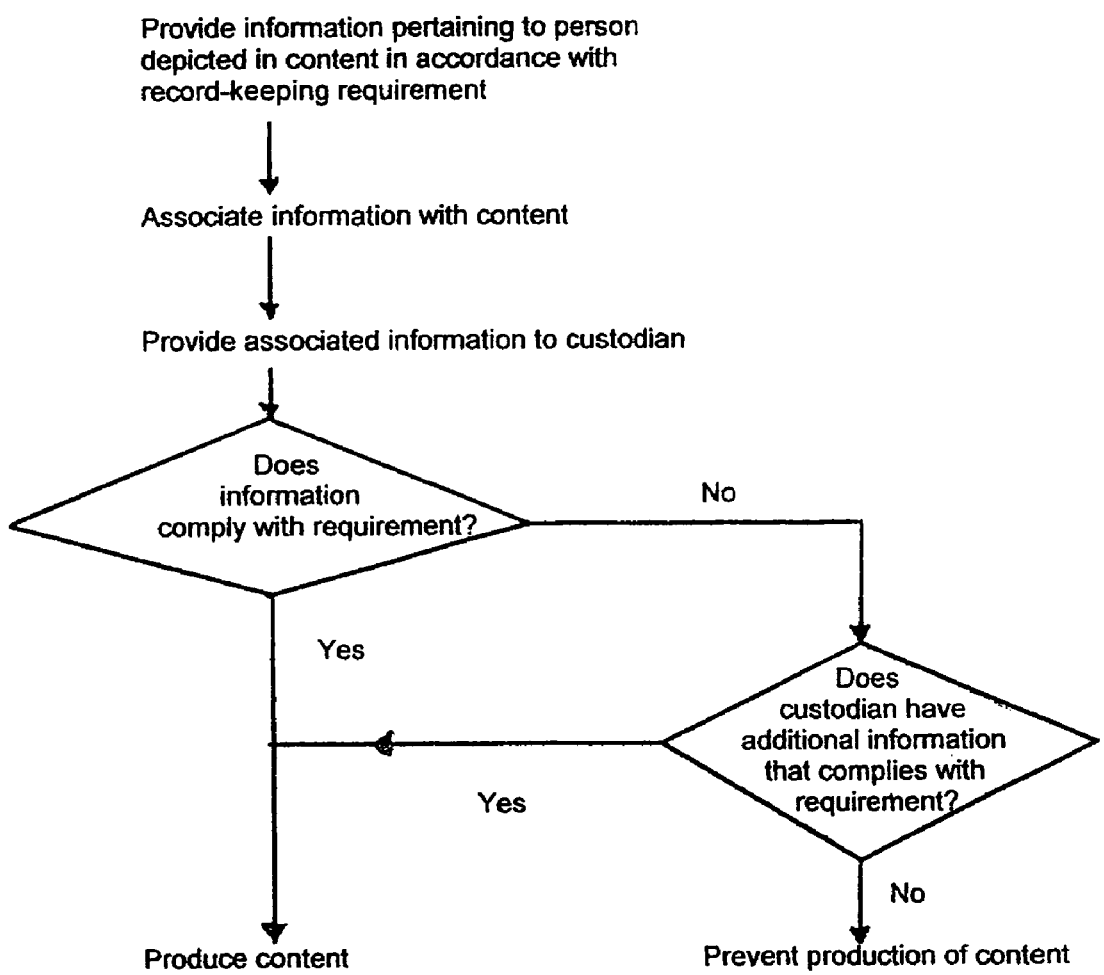
FIG. 7 is a flowchart illustrating a content production method using cross-referencing.

Production of content, like transmission of content, can be carried out and controlled according to analogous methods. In an exemplary production method as illustrated in FIG. 7, information is again provided and associated with the content to be produced, and the associated information is provided to a custodian. The adequacy of the information is again evaluated, and inadequate or missing information is retrieved from additional records in the keeping of the custodian (or other database(s)). Production of the content then proceeds when it is determined that information sufficient to comply with a record-keeping requirement has been provided and all authorization criteria have been satisfied; lacking such a determination, production of the content is prevented.

The content to be produced may not be subject to any particular regulation, such as a record-keeping requirement, but it may still be desirable to comply with various authorization criteria and to verify or cross-reference certain information pertaining to one or more persons to be depicted in the content. However, some of the desired information may be subject to local regulations concerning disclosure thereof. For example, some local jurisdictions may prohibit or regulate the disclosure of a person's medical records, including whether the person is or has been infected with a communicable disease. Methods of the present invention are beneficially applied in such circumstances.

Figure 8:
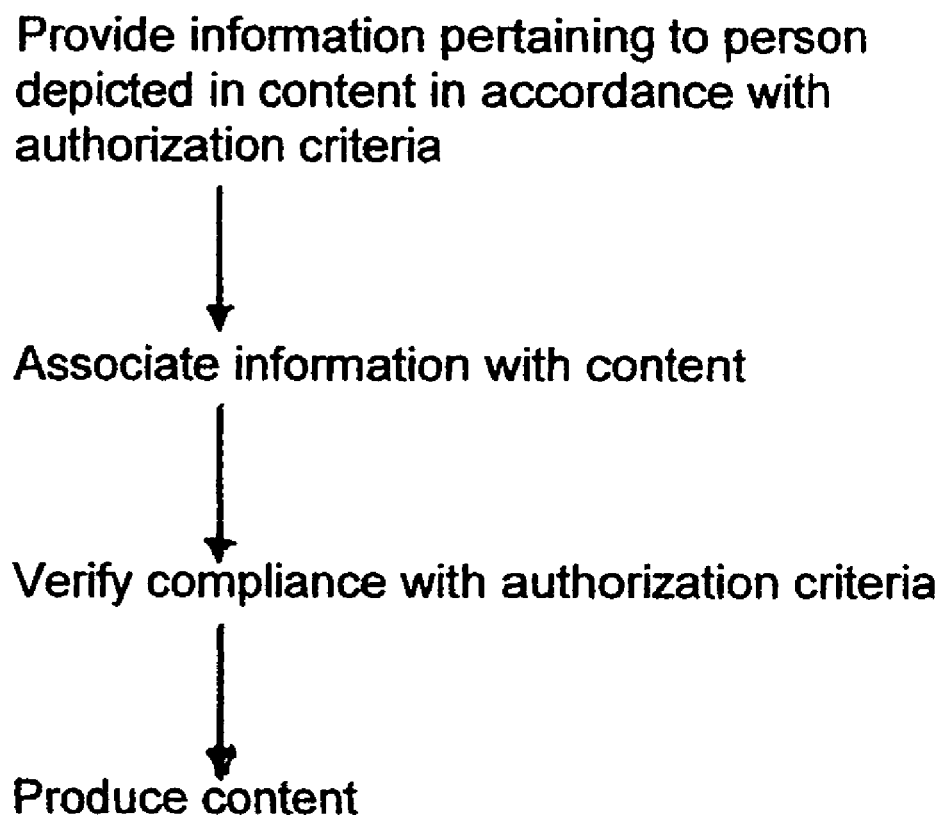
FIG. 8 is a flowchart illustrating a content production method using authorization criteria.
Figure 9:
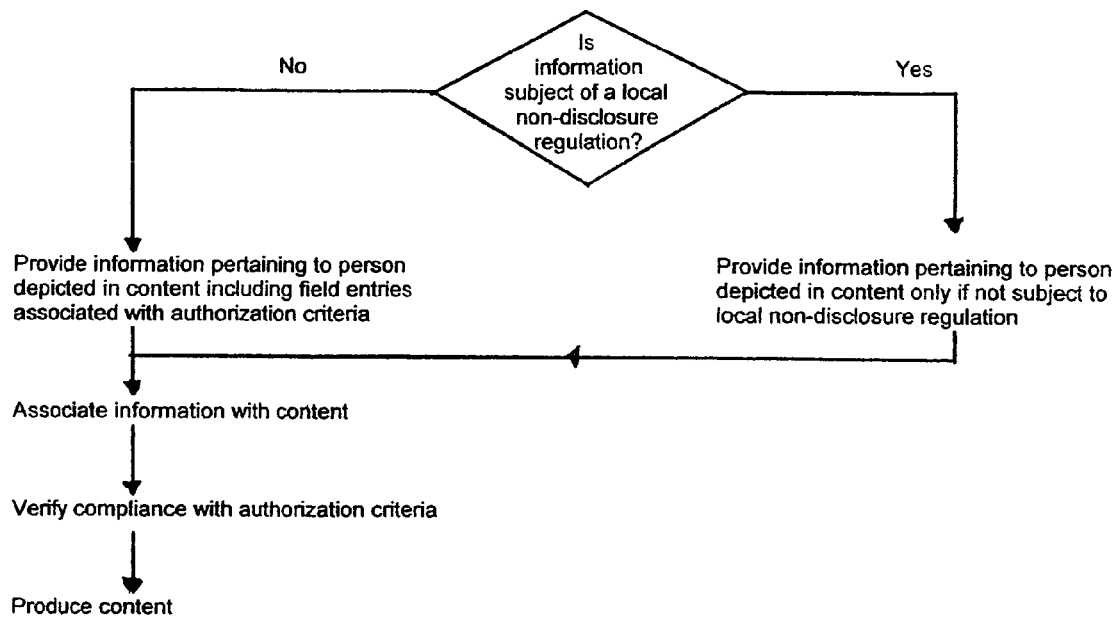
FIG. 9 is a flowchart illustrating a content production method using information that is subject to a local non-disclosure regulation.

Referring now to FIG. 8, information pertaining to a person to be depicted in at least a portion of the content is provided. The information is classified into a plurality of fields, as with previous methods, and at least a portion of the fields (e.g., model identification) are associated with authorization criteria. The information is associated with the content, again as with previous methods, and is examined in order to verify that the information so provided complies with all pertinent authorization criteria (a negative determination results in prevention of content production, as usual). After compliance with the authorization criteria is verified, production of the content commences.

Where local regulations pertaining to disclosure of personal information are applicable, a modification of the foregoing method is beneficially carried out. As shown in FIG. 9, prior to providing the information, it is first determined whether some or all of the information to be provided is subject t a local non-disclosure regulation. If no such regulation is applicable, the information is provided as usual. If at least some of the information is subject to a local non-disclosure regulation, then only that information which is not subject to the regulation is provided. The information so provided is associated, and compliance with applicable authorization criteria is verified as with previous methods. Local non-disclosure regulations may result in non-compliance with some or all authorization criteria. If all authorization criteria are met, production of the content commences.

Figure 10:
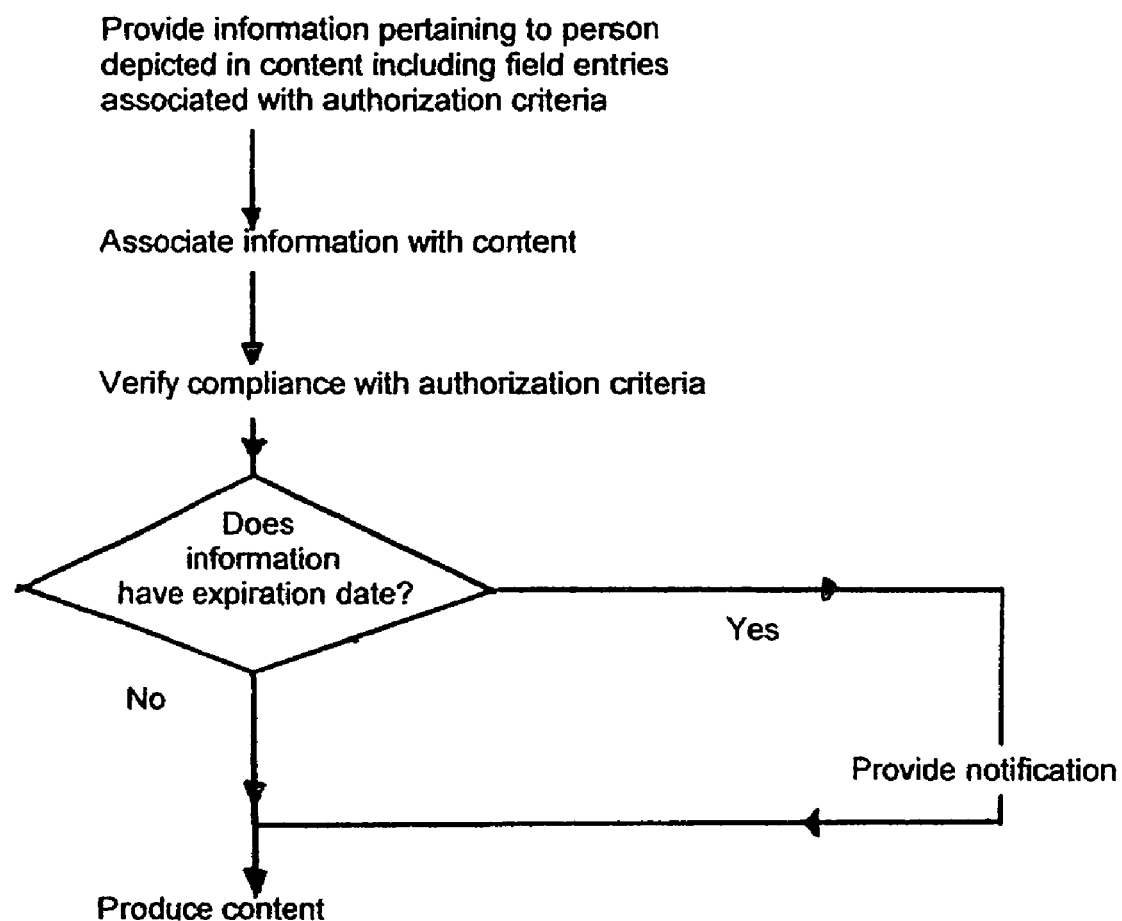
FIG. 10 is a flowchart illustrating a content production method for use with date-sensitive information.

With respect to production of content, as well as transmission of content, awareness of any date-dependent authorization criteria is important. For example, if a person to be depicted in the content provides an identification which has an expiration date, it is important for the producer of the content to be alerted to this fact in order for the producer to ensure that the person is not used in content production on any date after the expiration date of the identification. Referring now to the production method illustrated in FIG. 10, information is provided, associated and verified as with preceding methods such as the method shown in FIG. 8. Next, it is determined whether any of the information provided to the various fields is associated with an expiration date. If no expiration date is identified, production of the content proceeds. If an expiration date is identified, a notification is provided (e.g., to the producer of the content, to a database, etc.). The notification can include, for example, the name of the person, the field entry, the associated expiration date, a warning not to employ the person to produce content when the expiration date is reached, etc. Production of the content then proceeds after the notification has been provided.

Figure 11:
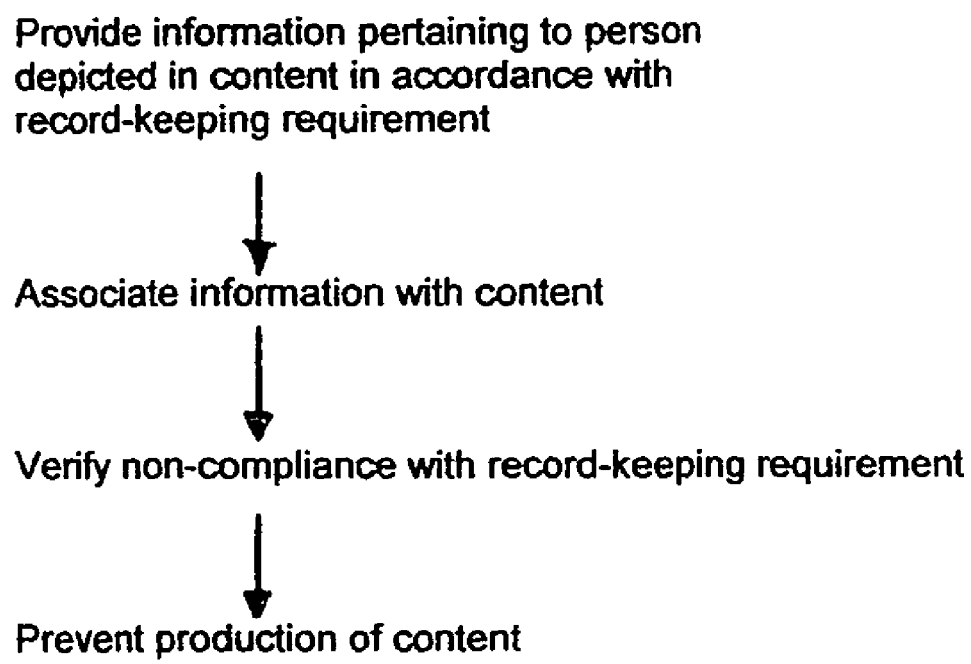
FIG. 11 is a flowchart illustrating a method for preventing the production of content when a record-keeping requirement is determined not to have been satisfied.

Generally, production of content can be prevented according to methods of the present invention whenever it is determined that one or more record-keeping requirements or other authorization criteria are not satisfied. A method of preventing the production of content subject to a record-keeping requirement, more specifically content that is intended to depict at least one person, is illustrated in FIG. 11. Information pertaining to the person who is to be depicted in at least a portion of the content is provided in accordance with a record-keeping requirement and is associated with the content. The information so provided is then examined. Upon verification that some or all of the information does not comply with the record-keeping requirement (e.g., due to failure to provide valid identification as an adult), production of the content is prevented. In particular instances, the person whose information fails to comply with the record-keeping requirement can be replaced with a person whose information complies with the record-keeping requirement. In other instances, production of the content can be interrupted or suspended.

Information can be provided to a custodian, more particularly in the form of a record, as previously described. The custodian can also be in possession of a plurality of records associated with a plurality of content. In such instances, the additional records can be examined to determine if compliant information is present when the information provided with respect to the content to be produced proves deficient or defective. Information pertaining to particular persons to be depicted in the content can also be cross-referenced when the person has been depicted in other content records of which are in the possession of the custodian.

Figure 12:
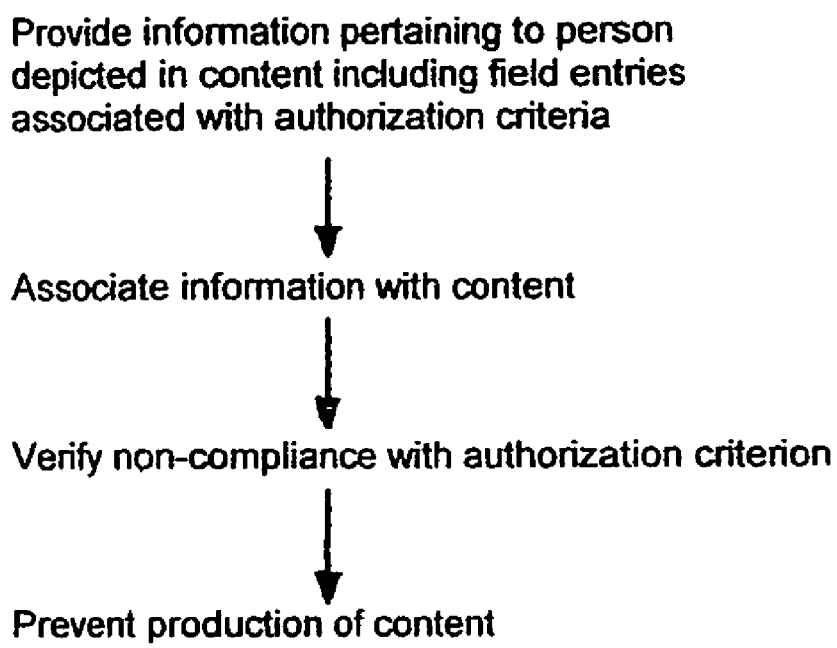
FIG. 12 is a flowchart illustrating a method for preventing the production of content when an authorization criterion (other than a record-keeping requirement) is determined not to have been satisfied.

Analogous methods of preventing content production when one or more authorization criteria (as described above) are not met are also provided. Referring to FIG. 12, information pertaining to the person who is to be depicted in at least a portion of the content is provided; the information is classified into a plurality of fields, at least a portion of which are associated with authorization criteria. The information so provided is then examined. Upon verification that some or all of the information does not comply with associated authorization criteria (e.g., due to failure to provide a valid model release or medical release), production of the content is prevented.

Figure 13:
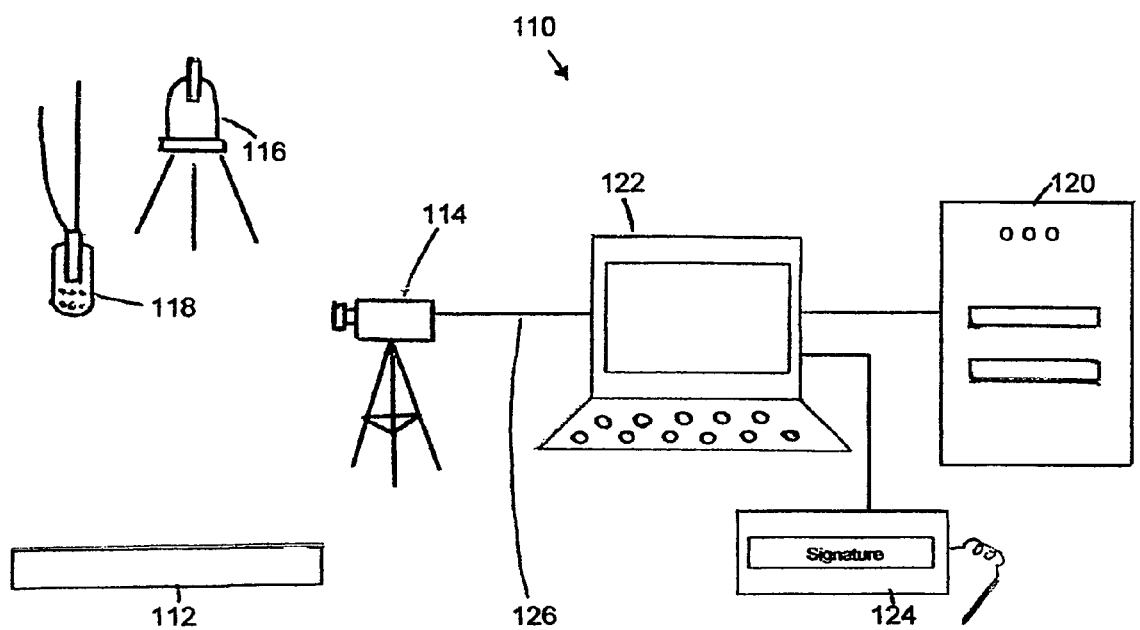
FIGS. 13-15 are schematic illustrations of systems for producing content, including a basic system (FIG. 13), a system using a second database (FIG. 14), and a system including multiple databases organized in a hierarchical structure (FIG. 15)
Figure 14:
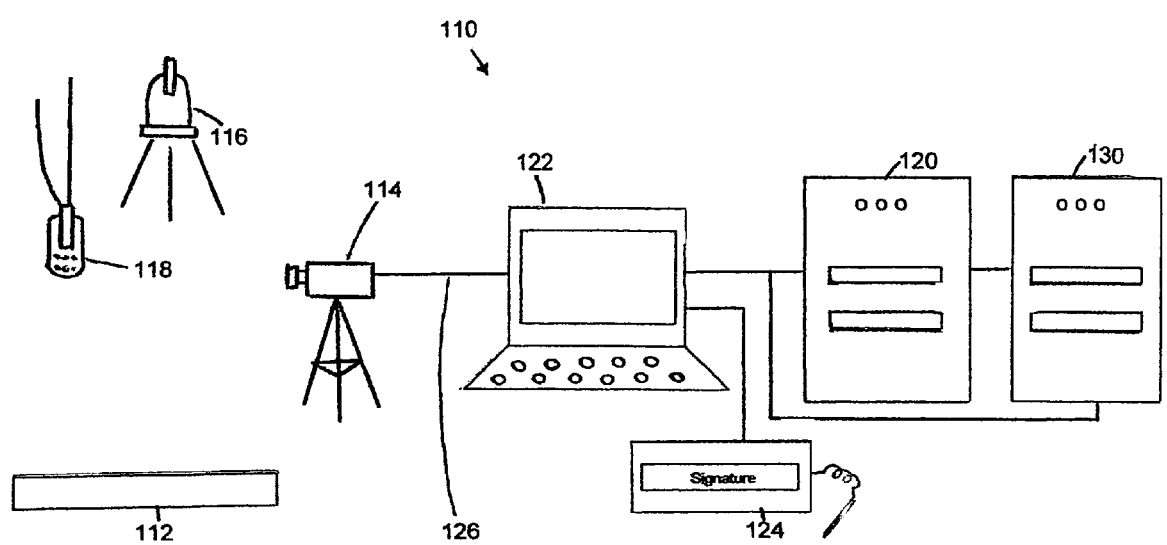
Figure 15:
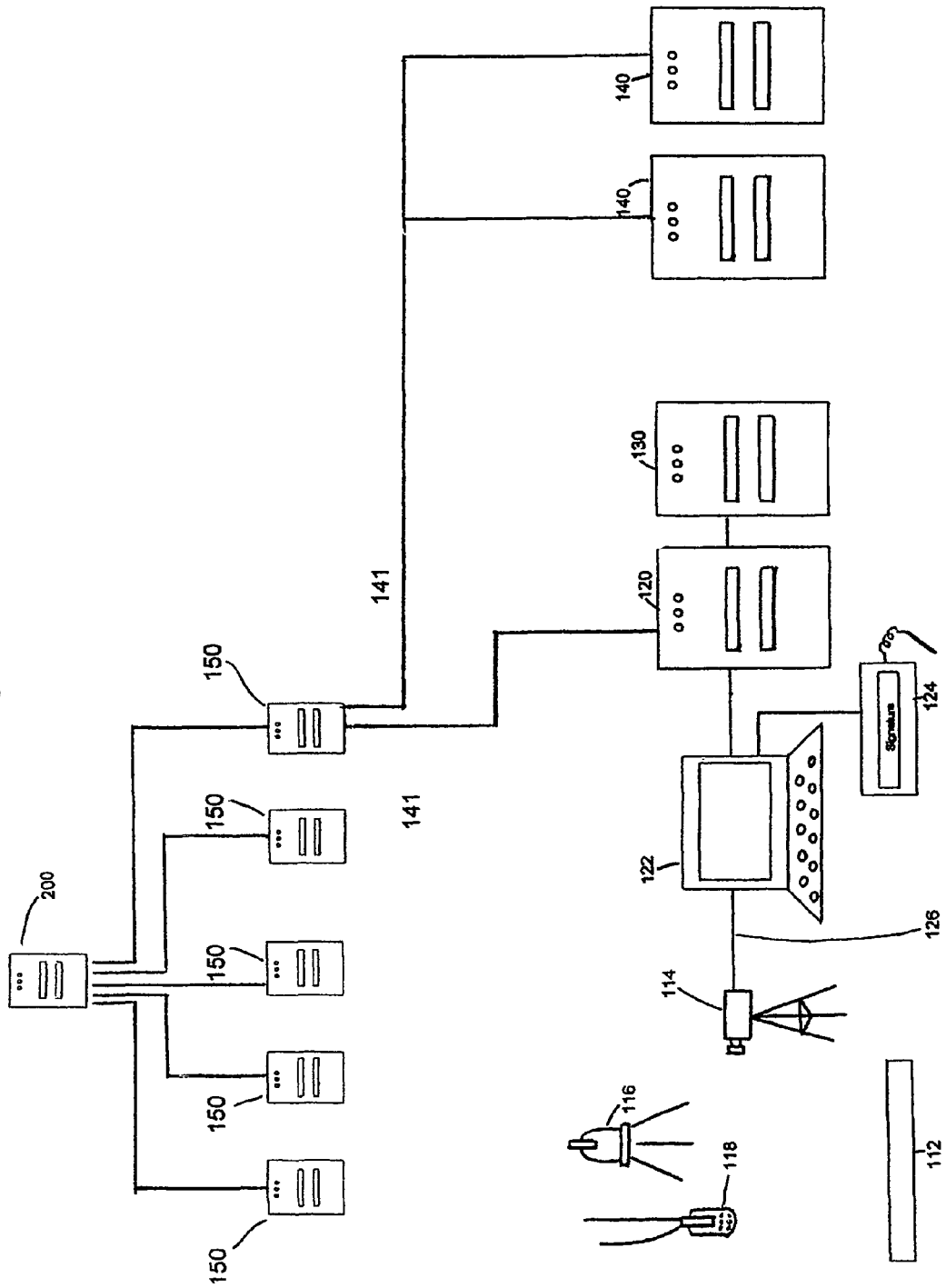

The foregoing methods for producing content are beneficially practiced using systems provided herein. FIGS. 13-15 illustrate exemplary systems. In FIG. 13, a system 110 for producing content, more specifically for producing content depicting at least one person, includes a stage 112, which can have various props such as furniture and other stage dressing, a camera 114 for recording film, video or digital images, a lighting system 116 and a sound system 118. A first database is stored within first storage device 120, such as a hard drive on a dedicated computer (i.e., a server) or another desired storage device. First input means 122, such as a computer located at the site of production of the content, affords access to the first database, for example via a network such as the Internet or via a cable or other connection, and allows information pertaining to a person to be depicted in the content to be provided to the first database. Means 124, such as an electronic signature pad, for providing a signature of the person to be depicted in the content, allow the signature to be provided to the first database, and further allow for verification of such entries as model releases, medical releases and the like by the person supplying the information.

In particular embodiments, the system 110 further includes means 126, such as a cable and appropriate software, for transferring at least a portion of the content as recorded by camera 114 to the first database. This allows stills, thumbnails, video streams, etc. to be transferred to and stored in the first database, and also to be used as entries into appropriate fields used to create a record for the content.

In order to ensure against accidental deletion, destruction, theft or seizure of some or all of the information in the first database, more specific embodiments of the inventive system include a second database in communication with the first database. In certain embodiments, the first and second databases are stored in a common storage device, such as a hard drive on a dedicated server or other electronic device. In other embodiments, the first and second databases are stored in separate storage devices. Referring to FIG. 14, a first database is stored in first storage device 120 (e.g., a computer hard drive), while a second database is stored in second storage device 130 (e.g., a hard drive on a separate computer), with the first and second storage devices being connected to allow the first and second data bases to be in communication with each other, thereby allowing transfer of information from the second database to the first database and vice versa.

First storage device 120 and second storage device 130 can both be in the possession of the producer of the content. Alternatively, one of the storage devices can be in the possession of the producer, while the other storage device can be in the possession of a custodian (as specified by a record-keeping requirement) or another person. If desired, both storage devices can be in the possession of a custodian, or each of the storage devices can be in the possession of persons other than the producer. Thus, for example, a producer could maintain a first storage device containing the first database, while a custodian could maintain a second storage device containing the second database.

The second storage device serves as a back-up for the first storage device. Using the first input means, information can be input into or accessed in the first database. If the first database becomes unavailable for some reason (e.g., hardware malfunction, theft or seizure of the first storage device, viral infection, etc.), the second database can be accessed via the first input means, and the information input into or retrieved from the second database.

Additional back-up capability can be provided through use of a system having a plurality of databases and storage devices organized into a hierarchical structure. In FIG. 15, a system as shown in FIG. 14 includes a first storage device 120, which, together with a second storage device 130 is in communication with a second-level storage device 150. Second-level storage device 150 is also in communication with additional storage devices 140 organized in parallel with storage devices 120 and 130. Means 141 for transferring information to the second-level device, such as network connections and related software, dedicated lines, and the like, are also provided. Each of the additional storage devices 140 can in turn be in communication with additional input means, cameras, signature input means and the like, allowing the production of a plurality of content at different locations.

Second-level storage device 150 stores a second-level database including information provided, via means 141, from the first database stored in first storage device 120 (and from the second database stored in second storage device 130, if employed). Information provided from databases stored on additional storage devices 140 is also stored in the second-level database. Thus, the second-level database functions as a back-up to the databases stored in the storage devices 120, 130 and 140 (the first-level databases), allowing information that may be missing from particular records in one of the first-level databases to be supplied from other records stored in the second-level database. Cross-referencing of information stored in the first-level databases can also readily be carried out by examination of the various records stored in the second-level database.

Similarly, storage device 200 stores a third-level database including information provided from the various databases stored in second-level storage devices 150. Further levels in the hierarchy can be added as desired in order to provide additional redundancy and back-up capacity, and to provide enlarged databases facilitating cross-referencing of entries in lower-level databases. Each of the various storage devices can be located at a different physical location and/or in the possession of a different person or organization.

Figure 16:
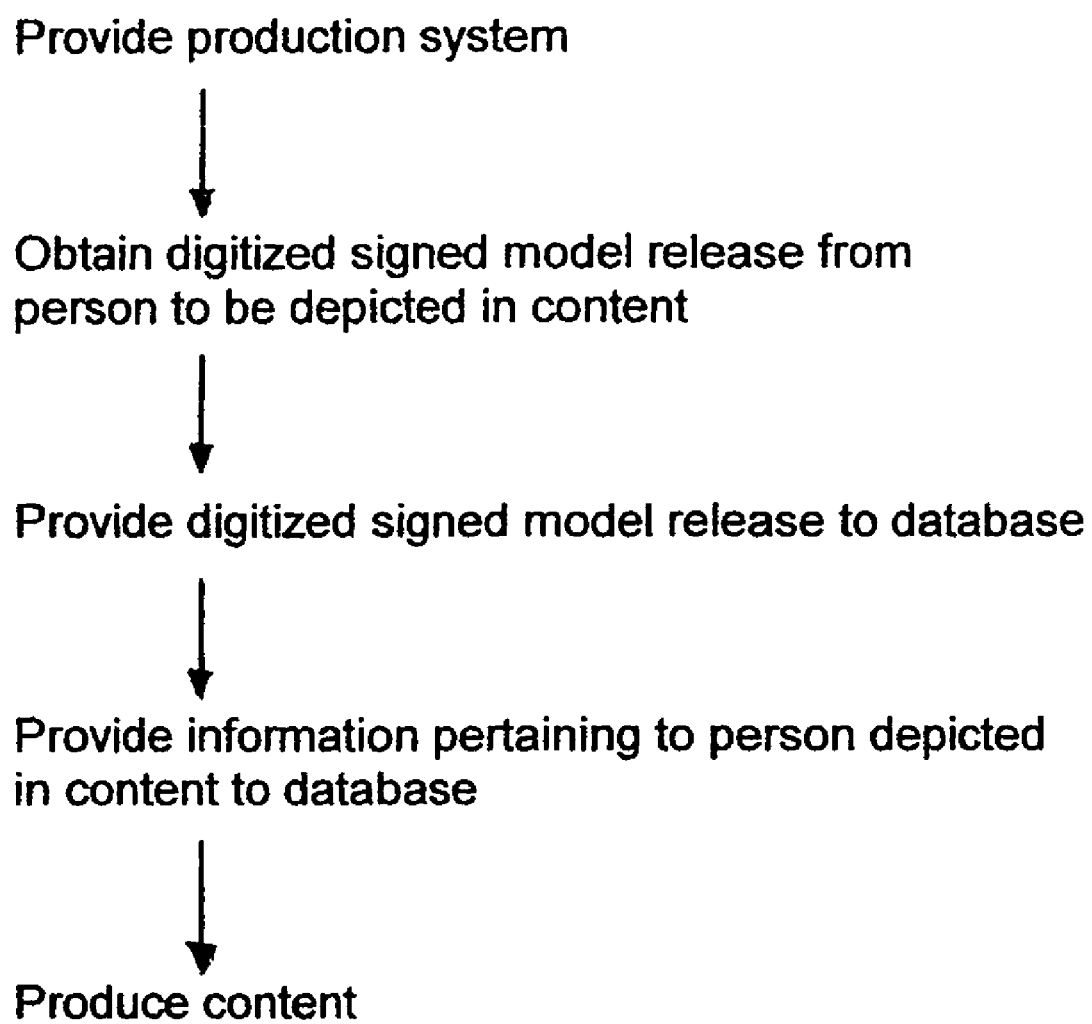
FIG. 16 is a flowchart illustrating a content production method using a system as shown in FIG. 13

Systems as described above can be used in conjunction with any of the various methods set forth above in the production and transmission of content. A typical method is illustrated in FIG. 16. A system as shown in FIG. 13, including means for producing content, a first database, first input means, and means for providing a signature of a person to the first database, is provided. A digitized model release is prepared and signed by a person to be depicted in the content, and the digitized signed model release is provided to the first database. Next, information pertaining to the person to be depicted in the content is provided to the first database using the first input means. After the information is provided to the first database, production of the content commences.

Various particular embodiments of the foregoing method will be readily apparent to those skilled in the art in view of the present disclosure. Any of the previously described methods of producing content, or of preventing the production of content, can be carried out using systems for producing content according to the invention, such as those illustrated in FIGS. 13-15.

Figure 17:
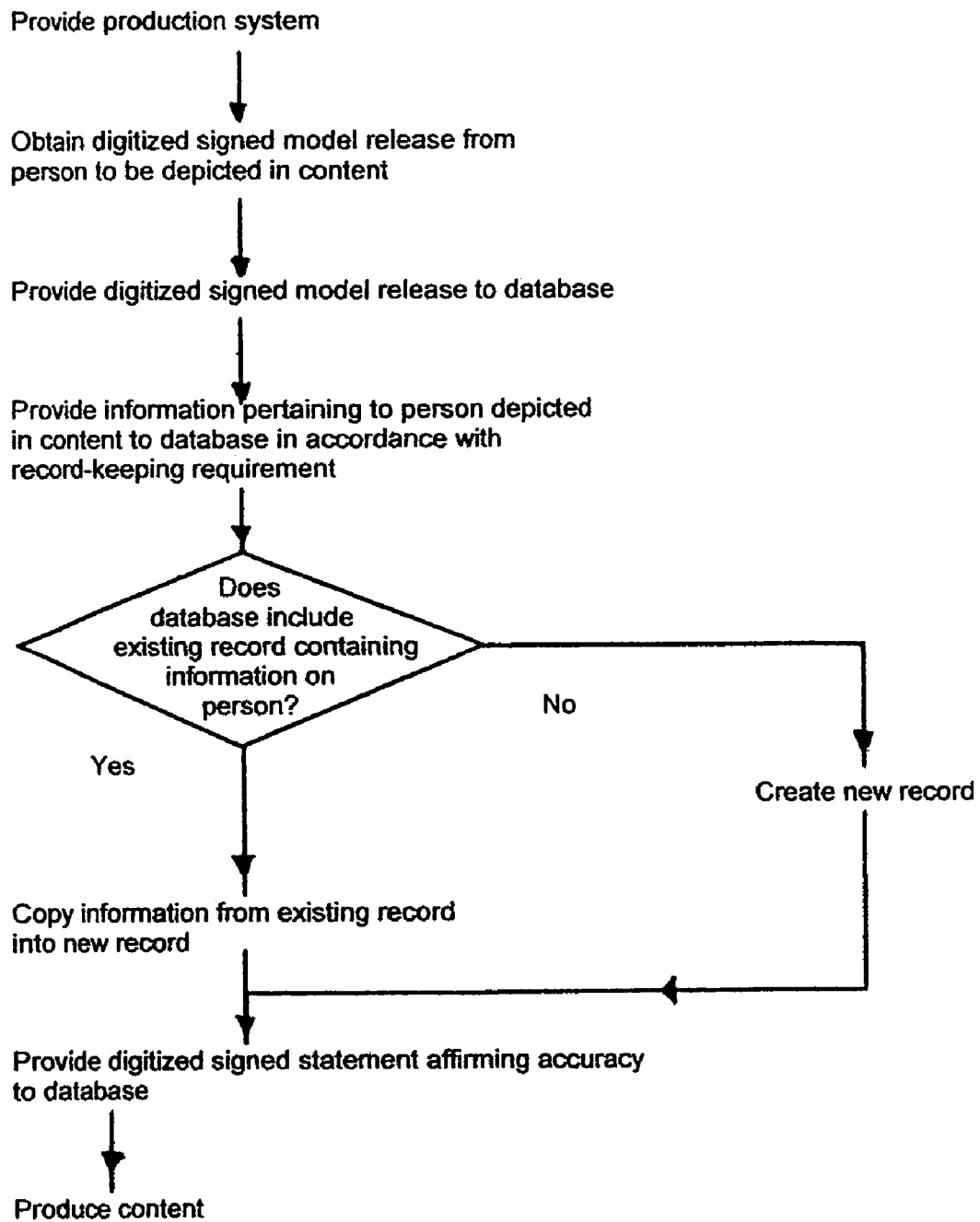
FIGS. 17-18 are flowcharts illustrating content production methods using systems of the invention.

Systems for producing content as described herein can also be used to produce statements affirming the accuracy of the information provided to the database and to include such statements in the database. In FIG. 17, information pertaining to at least one person to be depicted in the content, in accordance with a record-keeping requirement, is provided to a database. In the process of providing the information to the database, the database is examined to determine whether a record associated with previously produced content and containing information pertaining to the person is present in the database. If such a record is located, the information in the existing record is copied into the new record created in connection with the content to be produced, and additional information is provided to the extent necessary to produce a complete new record. A statement affirming the accuracy of the information in the existing record is then prepared and signed by the person using the means for providing a signature included in the production system. A digitized version of the signed statement is then provided to the database.

If no records containing information pertaining to the person are located in the database, the new record is produced using newly-provided information. Once the new record is produced (and its accuracy is affirmed, if appropriate), the record is associated with the content and stored in the database, and in more specific embodiments is provided to a custodian as prescribed by a record-keeping requirement. Production of the content then commences.

Figure 18:
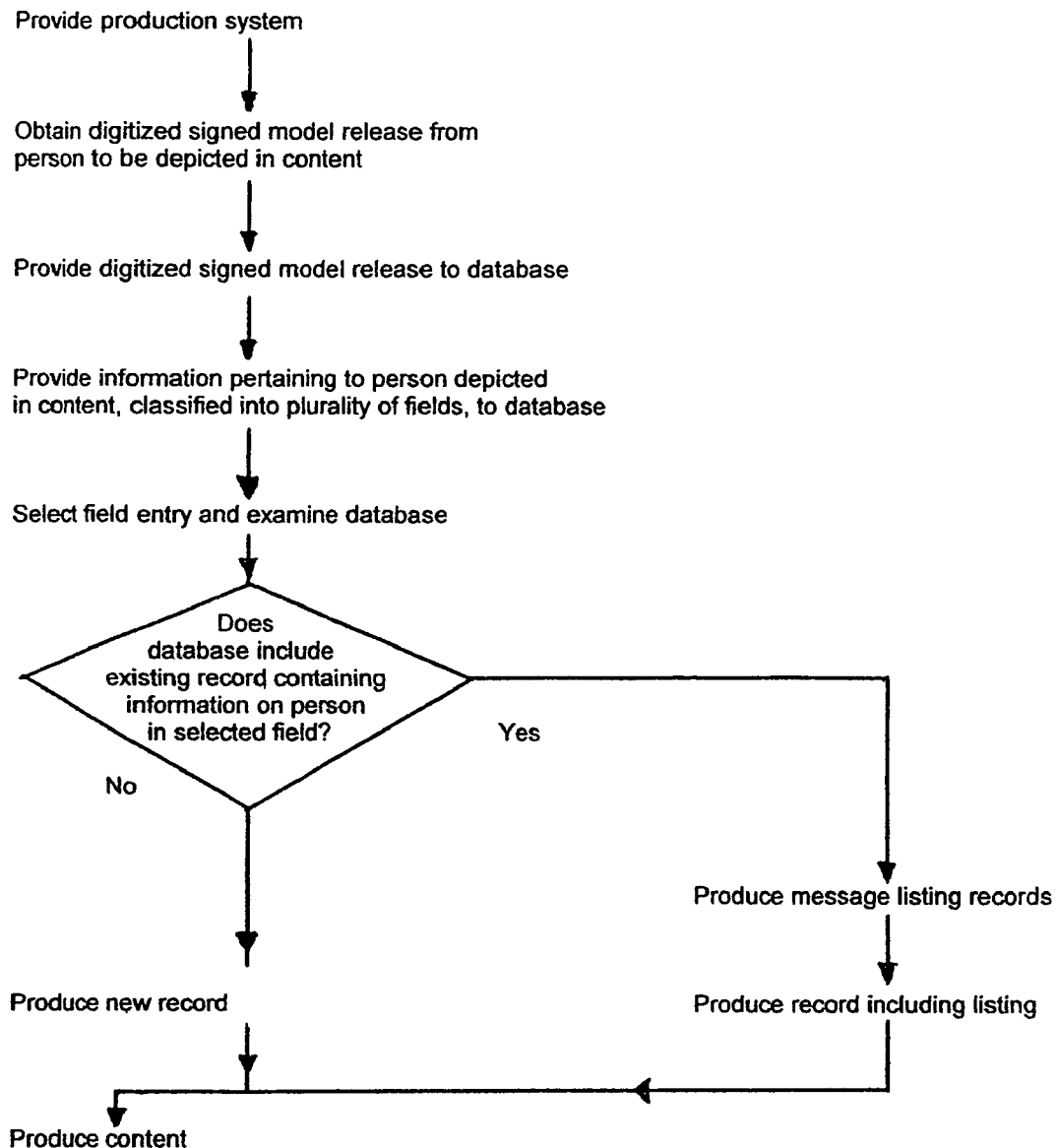

A further development of the foregoing method includes examination of the database to determine whether one or more existing records include information pertaining to a person to be depicted in the content, and which fields in the records contain entries. Referring to FIG. 18, a digitized signed model release is provided to the database as in preceding methods. Information pertaining to the person to be depicted in the content is provided, the information being classified into a plurality of fields. During the process of providing the information, a field is selected, and the database is examined to determine if one or more existing records contain information pertaining to the person and entered into the selected field. If one or more such records are present and contain information entered into the selected field, a message is produced noting the presence of the information. More particular embodiments generate a message that also includes a listing of each record containing information pertaining to the person in which the selected field contains an entry. For example, when the selected field is "content ID", such a message would include a listing of each record pertaining to content in which the person is depicted (i.e., a listing of each record containing information pertaining to the person in which the field "content ID" contains an entry). An additional record is then produced that includes the listing of each record so identified, and is stored in the database.

Once the information has been provided to the database, production of the content commences as usual.

Record-keeping, verification and cross-referencing are also beneficially carried out using systems of the invention that include more than one database, whether the databases are stored on a single storage device or multiple storage devices, in the latter case multiple storage devices that are located at one physical location or a plurality of physical locations and optionally in the possession of one or more custodians.

According to an exemplary method, a system is employed which includes first and second databases in communication with each other, as well as the previously described means for producing content, first input means and means for providing a signature to the first database. A digitized signed model release is obtained from a person to be depicted in the content and provided to the first database, and information pertaining to the person is provided to the first database using the first input means and associated with the content, typically by means of a record created to an identification of the content and the information so provided. The information can, in specific embodiments, be provided in accordance with a record-keeping requirement and/or be classified into a plurality of fields, and can be associated with authorization criteria which must be met before production of the content commences, all as discussed previously.

The associated information (e.g., in the form of the record created for the content), in more specific embodiments, is provided both to a first custodian in possession of the first database and to a second custodian in possession of the second database. This again provides additional security and back-up capability in the event of loss, theft, seizure, malfunction or other circumstances which render one of the two databases inaccessible. The first and second databases can be searched to determine if existing records containing information pertaining to the person are available, and information from such records can be copied into the newly created record for the content to be produced, in manners similar to those previously mentioned. More particularly, the second database is searched when the first database is determined not to include any existing records that include information pertaining to the person. Likewise, statements affirming the accuracy of the existing records can be obtained and provided to the first database, and optionally the second database.

Figure 19:
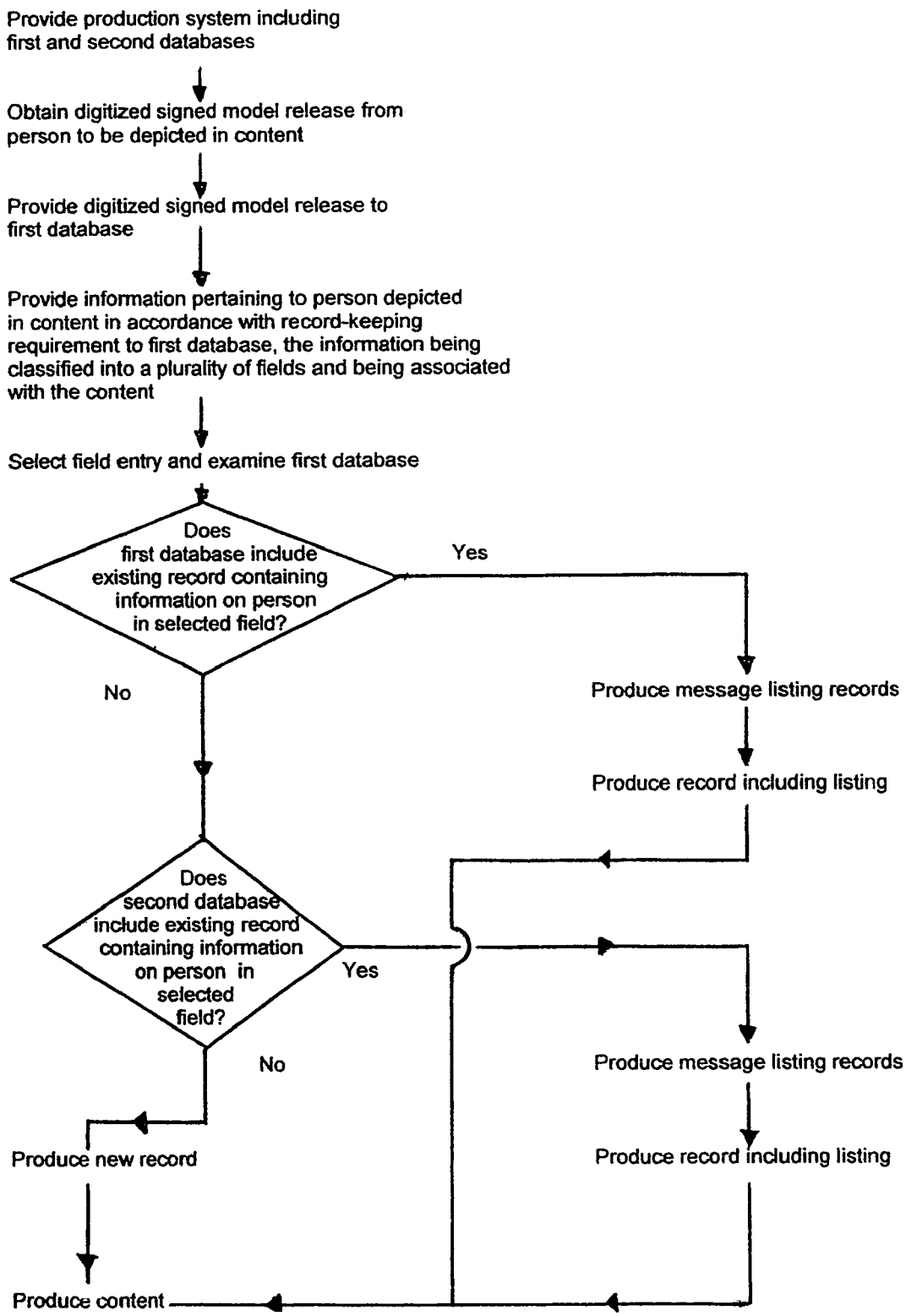
FIG. 19 is a flowchart illustrating a content production method using a system with a plurality of databases.

FIG. 19 illustrates a production method that makes use of a system including two databases. The second database is advantageously in the possession of a second custodian, and is also advantageously in communication with a plurality of additional databases, and thus includes information not also included in the first database. The first database is examined to determine whether a record exists that includes information pertaining to the person to be depicted in the content. If the first database includes such a record, the information included in that record is used to produce a new record for the content to be produced, and additional information is provided as needed in order to complete the new record. If the first database is determined not to include a record containing information pertaining to the person, the second database is examined and the process is repeated. If neither the first nor the second database is determined to include a record containing information pertaining to the person, then the new record is produced using information provided via the first input means. Production of the content subsequently commences.

The foregoing methods are readily extended to methods useful with systems having a multilevel, hierarchical structure and using a plurality of databases (and a plurality of storage devices) such as that illustrated in FIG. 15. In such methods, a first database is examined to determine whether information pertaining to the individual to be depicted in the content is present in the database. If pertinent information is located, it is used in the creation of a record for the content that is to be produced. If pertinent information is not present in the first database, a database in a higher level within the hierarchical structure is examined. Typically, a database at the level immediately above the level of the first database is examined (e.g., a database stored on storage unit 50 in FIG. 15), although specific embodiments of the method can proceed immediately to a higher-level database (e.g., a database stored on storage unit 100 in FIG. 15) if desired. When pertinent information is located in a higher-level database, the information is copied into the record for the content that is to be produced. If no such information is located in any database within the hierarchical structure, then the new record for the content that is to be produced is created using newly-supplied information.

Many of the foregoing embodiments are beneficially carried out in order to transmit content to an individual for the individual's private use. In such cases, the individual recipient of the transmission is the end user of the transmission. In other cases, however, the recipient of the transmission can in turn transmit the content to another recipient, such as an individual viewer or another recipient who subsequently retransmits the content. That is, the content can be transmitted either to an end user or to a distribution node within a network. Transmission of content via a network of distribution nodes can be carried out by means of so-called peer-to-peer systems. Peer-to-peer systems have the advantage, in comparison to more centralized systems that rely on an origin server, that they require less bandwidth to transmit comparable quantities of content.

Peer-to-peer systems, or other distributed systems, are particularly appropriate for transmission of content in the context of a membership organization. In such an organization, content is transmitted to the computer of a user who is a member of the organization. The member is offered the option, in return for a benefit (such as discounted or free membership, a cash payment, a tangible good, a service or some other valuable consideration), of authorizing the organization to use the member's computer as a node in a distribution network maintained by the organization. The member's computer thus becomes a secondary distribution source for the content. When another member requests transmission of content from the organization, the organization decides whether to transmit the content from the origin server, or from the node in the distribution network comprising the member's computer. With each additional member who agrees to permit his or her computer to serve as a node in the organization's distribution network, the effective bandwidth increases.

However, in the event that content transmitted by the organization is subject to a record-keeping requirement, the members whose computers are employed as nodes in the organization's distribution network may themselves become subject to the record-keeping requirement. If it is determined by the United States government, for example, that such nodes are subject to 18 U.S.C. §2257 and the regulations associated therewith, then the members will be required to maintain appropriate records; should the members fail to do so, the organization itself may be found to be in violation of the record-keeping requirement. Such a determination may be made in the event that the members themselves realize a commercial benefit, especially a benefit beyond receiving a benefit for acting as a distribution node, or in the event that the members attempt to affect the content before retransmission thereof. The latter case is particularly undesirable from the point of view of the organization.

Figure 20:
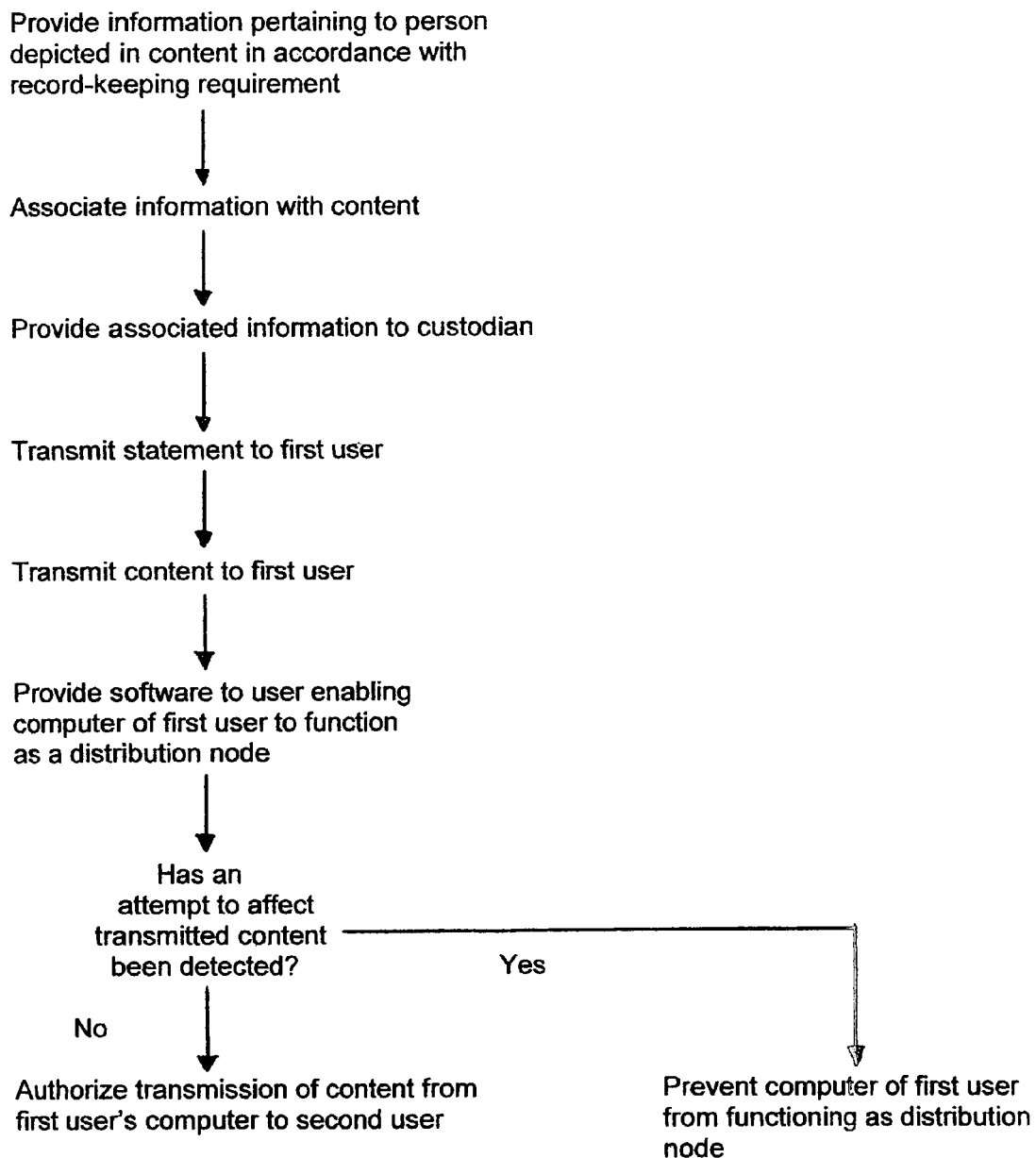
FIG. 20 is a flowchart illustrating a content transmission method which uses a user's computer as a distribution node for transmission of the content and disables the node in the event that the user attempts to affect the content and thus potentially become subject to a record-keeping requirement as a content producer.

In order to prevent members who permit an organization to use their computers as distribution nodes from potentially becoming subject to a record-keeping requirement, additional embodiments of the inventive method provide for cutting off a member's computer from access to the organization's distribution network in the event that the member attempts to affect the content which the organization transmits to the member's computer for re-transmission. As shown in FIG. 20, content is produced and transmitted to a member in a manner similar to the method of FIG. 4. However, in this embodiment, the member's computer is provided with software enabling the member's computer to function as a node in the organization's distribution network. This software includes an application which determines whether the member attempts to affect the content provided by the organization prior to its re-transmission to another member. In the event that the application detects an attempt by the member to affect the content (e.g., by editing the content, inserting or appending additional content, or otherwise modifying the content), the application causes the member's computer to be disconnected from the organization's network. The member's computer thus no longer functions as a distribution node for the organization. Hence, the organization is protected from liability in the event that the member is determined to be a producer of the content and is further found to have failed to comply with any applicable record-keeping requirement.

Once the content is provided to a user for possible re-transmission to another user (i.e., to a user's computer which also serves as a distribution node), it is also desirable to confirm that the content is in compliance with any applicable record-keeping requirement prior to re-transmission of the content. For example, it is desirable to verify that content subject to the record-keeping requirement of 18 U.S.C. §2257 includes an appropriate notice that is properly placed with respect to the content. Proper placement of a notice may depend on the type of content which is to be labeled (e.g., a photo, a video, a web page, etc.). Depending on the pertinent record-keeping regulation, a hyperlink to a web page which includes the required information may also be satisfactory.

Figure 21:
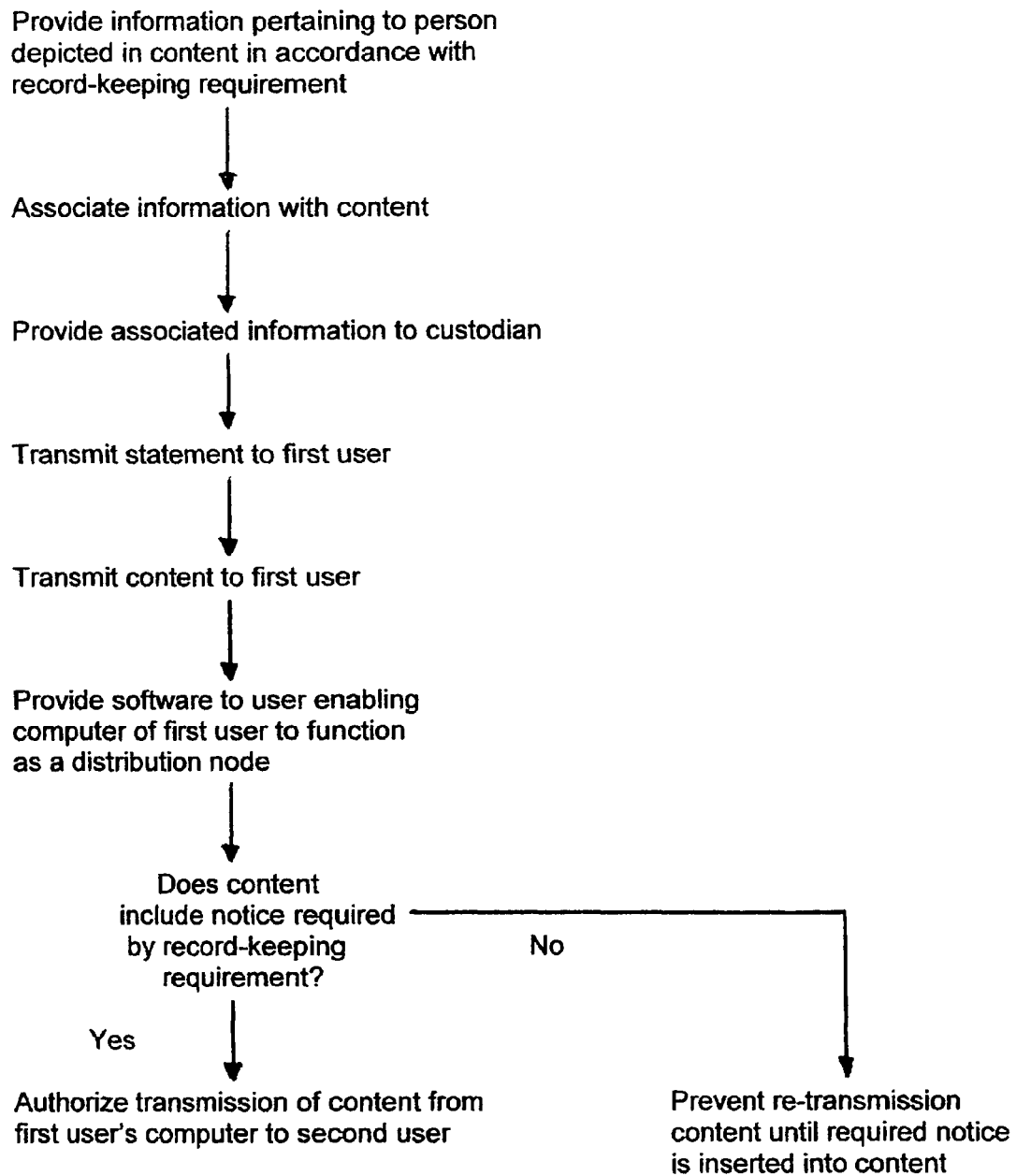
FIG. 21 is a flowchart illustrating a content transmission method similar to that of FIG. 20, but in which it is determined whether the content is properly labeled in accordance with a record-keeping requirement.

FIG. 21 illustrates an particular embodiment in which content is transmitted to a distribution node and checked for the presence and proper placement of a notice as required by an applicable record-keeping requirement. As in FIG. 20, the content is produced and transmitted to a member's computer, which serves as a distribution node. Once the content is transmitted to the member's computer, the type of content is ascertained, and it is then determined, using appropriate software provided to the member's computer, whether the content is in compliance with the record-keeping requirement. For example, when the content is a web page, the software verifies that the web page includes a notice which complies with the requirements of 18 U.S.C. §2257, i.e., that the notice includes all information required by the statute and associated regulations and is located in the proper place (i.e., on the URL page). If such a notice is not found, the software determines whether the web page includes a hyperlink to another page which includes the required information, and if so, activates the hyperlink and determines whether the information present on the hyperlinked page complies with the record-keeping requirement. When the content is a video file, or a video-on-demand transmission, the software determined whether the required notice is present at the beginning of the content, or in the end credits, as prescribed by the record-keeping requirement.

According to more particular embodiments, the content itself is provided with a file name which identifies the type of content being transmitted. For example, a photo can be provided with a file name including the .jpeg extension; a video file can be provided with a file name including the .video extension; a video-on-demand file with end credits can be provided with the .vodec extension; and the like. The file name facilitates determination of the proper location for placement of the required notice.

In the event that a required notice is absent from the content, re-transmission of the content is prevented and an appropriate notice is inserted into the content, if necessary after requesting the necessary information from the organization.

What is claimed is:

1. A method of transmitting content to a computer over a network, the content depicting at least one person and being subject to a federal record-keeping requirement, the method comprising the steps of:

(i) providing information to a computer system pertaining to a person depicted in at least a portion of the content in accordance with a federal record-keeping requirement, (ii) associating by the computer system the information with the content by storing the information together with an identification of the content in a storage medium independent of a medium used to transmit the content, (iii) providing by the computer system the associated stored information to a custodian, (iv) determining by the computer system that the stored associated information complies with the federal record-keeping requirement, and (v) transmitting the content by the computer system over a network based on the determination of compliance.

2. The method of claim 1 wherein the information is classified into a plurality of fields.

3. The method of claim 2 wherein at least a portion of the plurality of fields are associated with authorization criteria.

4. The method of claim 3 wherein at least a portion of the authorization criteria are derived from the federal record-keeping requirement.

5. The method of claim 4 wherein at least one of the plurality of fields is identification of the person and wherein the associated authorization criterion is entry of a valid identification of the person.

6. The method of claim 4 wherein at least one of the plurality of fields is age of the person and wherein the associated authorization criterion is entry of proof that the person's age at least equals an age specified by the federal record-keeping requirement.

7. The method of claim 4 wherein at least one of the plurality of fields is names used by the person other than the person's legal name and wherein the associated authorization criterion is entry of all names used by the person other than the person's legal name when the person has used at least one name other than the person's legal name.

8. The method of claim 4 wherein at least one of the plurality of fields is identification of the content and wherein the associated authorization criterion is provision of an identification of the content.

9. The method of claim 8 wherein the identification of the content is a unique randomly-generated identification.

10. The method of claim 4 wherein at least one of the plurality of fields is date of production of the content and wherein the associated authorization criterion is entry of a date of production of the content.

11. The method of claim 1 wherein in step (ii) a record is created which includes the information pertaining to the content.

12. The method of claim 11 wherein in step (iii) the record is provided to the custodian.

13. The method of claim 12 wherein the custodian possesses records including information associated with a plurality of content.

14. The method of claim 13 wherein the custodian possesses a record including information associated with additional content in which the person is depicted.

15. The method of claim 14 wherein the record including information associated with the additional content in which the person is depicted is provided to and examined by the computer system when in step (iv) it is determined by the computer system that the information provided in step (i) does not comply with the federal record-keeping requirement and wherein information associated with the additional content is provided to the record created in step (ii) when it is determined by the computer system that the information associated with the additional content complies with the federal record-keeping requirement.

16. The method of claim 15 wherein in step (iv) it is determined that the information provided in step (i) omits an entry for at least one field required by the federal record-keeping requirement.

17. The method of claim 1 wherein prior to step (v) a statement is provided by the computer system comprising information pertaining to the portion of the content in accordance with the federal record-keeping requirement and (b) a location of the custodian.

18. A method of transmitting content over a network, the content being subject to a federal record-keeping requirement, the method comprising the steps of:

(i) providing to a computer system information pertaining to at least a portion of the content in accordance with a federal record-keeping requirement , (ii) associating by the computer system the information with the content by storing the information together with an identification of the content in a storage medium independent of a medium used to store the content, (iii) providing by the computer system the stored associated information to a custodian, (iv) determining by the computer system that the stored associated information complies with the federal record-keeping requirement, and (v) transmitting the content over a network based on the determination of compliance.

19. The method of claim 18 wherein the content comprises a depiction of at least one person.

20. The method of claim 19 wherein in step (i) information is provided pertaining to the at least one person depicted in the content.

21. The method of claim 18 wherein in step (ii) a record is created which includes an identification of the portion of the content and the information pertaining to the portion of the content.

22. The method of claim 21 wherein in step (iii) the record is provided to the custodian.

23. The method of claim 18 wherein in step (v) the content is transmitted over a computer network.

24. The method of claim 18 wherein in step (v) the content is transmitted over a telecommunications network.

25. The method of claim 24 wherein the content is transmitted over a cellular telephone network.

26. The method of claim 18 wherein the content is transmitted to a monitor.

27. The method of claim 18 wherein the content is transmitted to a human viewer.

28. The method of claim 27 wherein the viewer provides to a site that controls transmission of the content verification that the viewing of the content is legally permissible at the viewer's physical location.

29. The method of claim 27 wherein the viewer provides to the site that controls transmission of the content proof of the viewer's right to receive the transmission of the content.

30. The method of claim 27 wherein the viewer provides to the site that controls transmission of the content a credit card account number.

31. The method of claim 27 wherein the viewer is charged a premium prior to step (v).

32. The method of claim 27 wherein the viewer is provided with a statement prior to step (iv), the statement comprising information pertaining to the portion of the content in accordance with the record keeping requirement and a location of the custodian.

33. The method of claim 18 wherein step (v) is carried out only after step (iv) is completed.

34. The method of claim 18 wherein the content is transmitted to a storage device.

35. A method of preventing transmission of content to a computer over a network, the content depicting at least one person and being subject to a federal record-keeping requirement, the method comprising the sequential steps of:
  (i) providing information to a computer system pertaining to a person depicted in at least a portion of the content in accordance with a federal record-keeping requirement,
  (ii) associating by the computer system the information with the content by storing the information together with an identification of the content in a storage medium independent of a medium used to transmit the content,
  (iii) providing by the computer system the stored associated information to a custodian,
  (iv) determining by the computer system that the stored associated information does not comply with the federal record-keeping requirement, and
  (v) preventing, by the computer system, transmission of the content to a computer over a network based on the determination of non-compliance.

36. The method of claim 35 wherein the information is classified into a plurality of fields.

37. The method of claim 36 wherein at least a portion of the plurality of fields are associated with authorization criteria that are derived from the federal record-keeping requirement.

38. The method of claim 35 wherein in step (ii) a record is created which includes the information pertaining to the content.

39. The method of claim 38 wherein in step (iii) the record is provided to the custodian.

40. The method of claim 39 wherein the custodian possesses records including information associated with a plurality of content.

41. The method of claim 40 wherein the custodian possesses a record including information associated with additional content in which the person is depicted.

42. The method of claim 41 wherein the record including information associated with the additional content in which the person is depicted is examined when in step (iv) it is determined that the information provided in step (i) does not comply with the federal record-keeping requirement and wherein it is further determined that the information associated with the additional content does not comply with the federal record-keeping requirement.

43. The method of claim 42 wherein in step (iv) it is determined that the information provided in step (i) omits at least one item required by the federal record-keeping requirement.

44. The method of claim 37 wherein in step (iv) it is determined that at least one authorization criterion derived from the federal record-keeping requirement is not satisfied.

45. A method of producing content, the content to be produced depicting at least one person and being subject to a federal record-keeping requirement, the method comprising the steps of:
  (i) providing to a computer system information pertaining to a person to be depicted in at least a portion of the content in accordance with a federal record-keeping requirement,
  (ii) associating by the computer system the information with the content to be produced by storing the information together with an identification of the content to be produced in a storage medium independent of a medium to be used to store the content,
  (iii) providing by the computer system the stored associated information to a custodian,
  (iv) determining by the computer system that the stored associated information complies with the federal record-keeping requirement, and
  (v) producing the content based on the determination of compliance.

46. The method of claim 45 wherein the information is classified into a plurality of fields.

47. The method of claim 46 wherein at least a portion of the plurality of fields are associated with authorization criteria.

48. The method of claim 47 wherein at least a portion of the authorization criteria are derived from the federal record-keeping requirement.

49. The method of claim 48 wherein at least one of the plurality of fields is identification of the person and wherein the associated authorization criterion is entry of a valid identification of the person.

50. The method of claim 48 wherein at least one of the plurality of fields is age of the person and wherein the associated authorization criterion is entry of proof that the person's age at least equals an age specified by the federal record-keeping requirement.

51. The method of claim 48 wherein at least one of the plurality of fields is names used by the person other than the person's legal name and wherein the associated authorization criterion is entry of all names used by the person other than the person's legal name when the person has used at least one name other than the person's legal name.

52. The method of claim 48 wherein at least one of the plurality of fields is identification of the content and wherein the associated authorization criterion is provision of an identification of the content.

53. The method of claim 52 wherein the identification of the content is a unique randomly-generated identification.

54. The method of claim 48 wherein at least one of the plurality of fields is date of production of the content and wherein the associated authorization criterion is entry of a date of production of the content.

55. The method of claim 45 wherein in step (ii) a record is created which includes the information pertaining to the content.

56. The method of claim 55 wherein in step (iii) the record is provided to the custodian.

57. The method of claim 56 wherein the custodian possesses records including information associated with a plurality of content.

58. The method of claim 57 wherein the custodian possesses a record including information associated with additional content in which the person is depicted.

59. The method of claim 58 wherein the record including information associated with the additional content in which the person is depicted is provided to and examined by the computer system when in step (iv) it is determined that the information provided in step (i) does not comply with the federal record-keeping requirement and wherein information associated with the additional content is provided by the computer system to the record created in step (ii) when it is determined that the information associated with the additional content complies with the federal record-keeping requirement.

60. The method of claim 59 wherein in step (iv) it is determined that the information provided in step (i) omits an entry for at least one field required by the federal record-keeping requirement.

61. The method of claim 45 wherein in step (v) a statement is included in the content, the statement comprising (a) information pertaining to the portion of the content in accordance with the federal record-keeping requirement and (b) a location of the custodian.

62. A method of producing content over a network, the content depicting at least one person, the method comprising the steps of:
(i) providing to a computer system information pertaining to a person to be depicted in at least a portion of the content, the information being classified into a plurality of fields, at least a portion of the field being associated with authorization criteria,
(ii) associating by the computer system the information with the content to be produced by storing the information together with an identification of the content to be produced in a storage medium independent of a medium to be used to store the content,
(iii) providing by the computer system the stored associated information to a custodian,
(iv) determining by the computer system that the stored associated information complies with the authorization criteria, and
(v) producing the content based on the determination of compliance.

63. The method of claim 62 wherein at least one of the plurality of fields is model release and wherein the associated authorization criterion is entry of a model release signed by the person.

64. The method of claim 63 wherein in step (i) the person executes a model release at a location in which the content is to be produced and wherein a digitized version of the executed model release is entered.

65. The method of claim 62 wherein at least one of the plurality of fields is medical release and wherein the associated authorization criterion is entry of a medical release signed by the person.

66. The method of claim 65 wherein an additional authorization criterion is freedom from communicable diseases and wherein a medical record of the person is examined pursuant to the signed medical release in order to verify that the person is free from communicable diseases.

67. The method of claim 62 wherein step (iv) is carried out only after step (iii) is completed.

68. The method of claim 62 wherein prior to step (i) it is determined whether information to be provided is subject to a regulation of a jurisdiction in which the information is located prohibiting the disclosure thereof.

69. The method of claim 68 wherein only information that is determined not to be subject to a regulation of a jurisdiction in which the information is located prohibiting the disclosure thereof is provided.

* * * * *